US006970107B2

(12) United States Patent
Gannett

(10) Patent No.: US 6,970,107 B2
(45) Date of Patent: Nov. 29, 2005

(54) FLIGHT SITUATION PRESENTATION SYSTEM AND METHOD

(76) Inventor: James R. Gannett, 14443 NE. 61st St., Redmond, WA (US) 98052-4672

( * ) Notice: Subject to any disclaimer, the term of this patent is extended or adjusted under 35 U.S.C. 154(b) by 87 days.

(21) Appl. No.: 10/630,137

(22) Filed: Jul. 29, 2003

(65) Prior Publication Data

US 2005/0024237 A1    Feb. 3, 2005

(51) Int. Cl.⁷ ............................................. G08B 23/00
(52) U.S. Cl. ............................ 340/967; 340/968; 701/4
(58) Field of Search ................................ 340/967, 966, 340/968, 974, 975; 701/6, 4, 14

(56) References Cited

U.S. PATENT DOCUMENTS

| 4,390,950 | A | * | 6/1983 | Muller ............................ 701/4 |
| 4,728,951 | A | * | 3/1988 | Johnson et al. ............... 340/968 |
| 4,797,674 | A | * | 1/1989 | Zweifel et al. ............... 340/968 |
| 5,003,305 | A | | 3/1991 | Kelly |
| 5,016,177 | A | | 5/1991 | Lambregts |
| 5,357,263 | A | | 10/1994 | Fischer et al. |
| 5,359,890 | A | | 11/1994 | Fulton et al. |
| 5,467,085 | A | | 11/1995 | Dunn |
| 6,057,786 | A | * | 5/2000 | Briffe et al. ................. 340/975 |
| 6,085,129 | A | | 7/2000 | Schardt et al. |
| 6,154,151 | A | | 11/2000 | McElreath et al. |
| 6,204,779 | B1 | * | 3/2001 | Berlioz et al. ............... 340/970 |
| 6,262,674 | B1 | * | 7/2001 | Wyatt ........................... 340/975 |
| 6,273,370 | B1 | * | 8/2001 | Colgren ......................... 244/181 |
| 6,469,640 | B2 | | 10/2002 | Wyatt |
| 6,571,155 | B2 | * | 5/2003 | Carriker et al. ................ 701/3 |

OTHER PUBLICATIONS

Ibold, Ken, "The Lost Horizon: The Search for a Cure for Spatial Disorientation Ranges From Intruments to Instruction," *Aviation Safety* vol. XIX, No. 9, Sep. 1999.
Johnson, Steven L. and Roscoe, Stanley N., "What Moves, the Airplane or the World?" *Human Factors* 14(2), pp. 107–129, 1972.

* cited by examiner

*Primary Examiner*—John Tweet, Jr.
(74) *Attorney, Agent, or Firm*—Brian L. Johnson; Davis Wright Tremaine LLP

(57) ABSTRACT

A flight situation presentation system displays a large majority of the information required for piloting an aircraft in an enhanced manner to reduce potential for misinterpretation and instances of piloting error. Approaches include visual integration of flight data indicators into various functional display areas and further visual integration of the various functional display areas. Visual integration includes creating a synergism amongst the flight data indicators being presented so that the indicators tend not to distract from each other, but rather help to reinforce each other in presenting fully representative flight situation information. Techniques for visual integration include placement of flight data indicators in certain positions on a display relative to one another based upon functional relationships between the operational parameters being monitored.

16 Claims, 29 Drawing Sheets

FLIGHT SITUATION PRESENTATION SYSTEM AND METHOD

BACKGROUND OF THE INVENTION

1. Field of the Invention

The present invention is directed generally to aircraft indicating systems, and more particularly, to flight situation displays involving multiple flight parameters.

2. Description of the Related Art

Pilot error contributes to many aviation accidents. A significant portion of pilot error has basis in misinterpretation of flight data indicators provided by cockpit instrumentation and at times insufficient data provided to the pilot by the flight data indicators regarding the flight situation of the aircraft. Proper interpretation of flight data indicators depends on pilot skill and basic human factors. Conventional implementations of flight data indicators have been somewhat improved to lessen the potential for misinterpretation. Unfortunately these implementations of conventional flight data indicators still are unnecessarily complex, prone for misinterpretation, and insufficient to convey a fully representative flight situation of an aircraft.

BRIEF SUMMARY OF THE INVENTION

The present invention resides in a system and method for flight situation presentation. Embodiments include a method involving receiving data regarding an aircraft and displaying in an indicated airspeed (IAS) area of a display an IAS indicator to indicate IAS of the aircraft. The method further includes displaying in a flight path angle (FPA) area of the display a FPA indicator to indicate a FPA of the aircraft, the FPA indicator and the IAS indicator being positioned relative to one another on the display to visually integrate the IAS area and the FPA area. The method further includes displaying a banked attitude indicator in an area of the display to indicate banked attitude of the aircraft, the banked attitude indicator and the FPA indicator being positioned relative to one another on the display to visually integrate the banked attitude indicator with the FPA area. The method further includes displaying a predictive track indicator in a navigation area of the display to indicate direction of the aircraft, the predictive track indicator and the banked attitude indicator being positioned relative to one another to visually integrate the banked attitude indicator with the navigation area. The method further includes displaying an altitude indicator in an altitude area of the display, the altitude indicator and the FPA indicator being positioned relative to one another on the display to visually integrate the altitude area with the FPA area.

Other features and advantages of the invention will become apparent from the following detailed description, taken in conjunction with the accompanying drawings.

BRIEF DESCRIPTION OF THE SEVERAL VIEWS OF THE DRAWING(S)

DETAILED DESCRIPTION OF THE INVENTION

As will be discussed in greater detail herein, a flight situation presentation system displays a large majority of the information required for piloting an aircraft in an enhanced manner to reduce potential for misinterpretation and instances of piloting error. Approaches include visual integration of flight data indicators into various functional display areas and further visual integration of the various functional display areas. Visual integration includes creating a synergism amongst the flight data indicators being presented so that the indicators tend not to distract from each other, but rather help to reinforce each other in presenting fully representative flight situation information.

Techniques for visual integration include placement of flight data indicators in certain positions on a display relative to one another based upon functional relationships between the operational parameters being monitored. By placing flight data indicators in certain relational positions, flight situation information can be effectively portrayed so that a user may better maintain reference with a plurality of flight data indicators with less likelihood of becoming disoriented with respect to one or more of the operational parameters being presented. Further techniques include alignment of selected indicators from various functional groupings of indicators found in various display areas to visually tie in the functional groupings with one another to further reinforce a synergistic presentation of the fully representative flight situation information.

Not only is the flight situation presentation system useful for piloting an aircraft, it can also be used for instruction in how to pilot an aircraft such as with a simulation environment. Advantages of its use for instruction are based in part on the opportunity provided by the flight situation presentation system for a student to readily acquire a hands-on appreciation for what information is useful to piloting and an understanding of how this information is used in given situations without also having to deal with the added complications and lack of integration associated with conventional instrumentation. Once this hands-on understanding and appreciation is acquired, if necessary due to lack of availability of the flight situation presentation system in conventional aircraft, the conventional instrumentation can be learned with a better understanding by the student of what the conventional instrumentation can provide and also its limitations.

Figure 1:
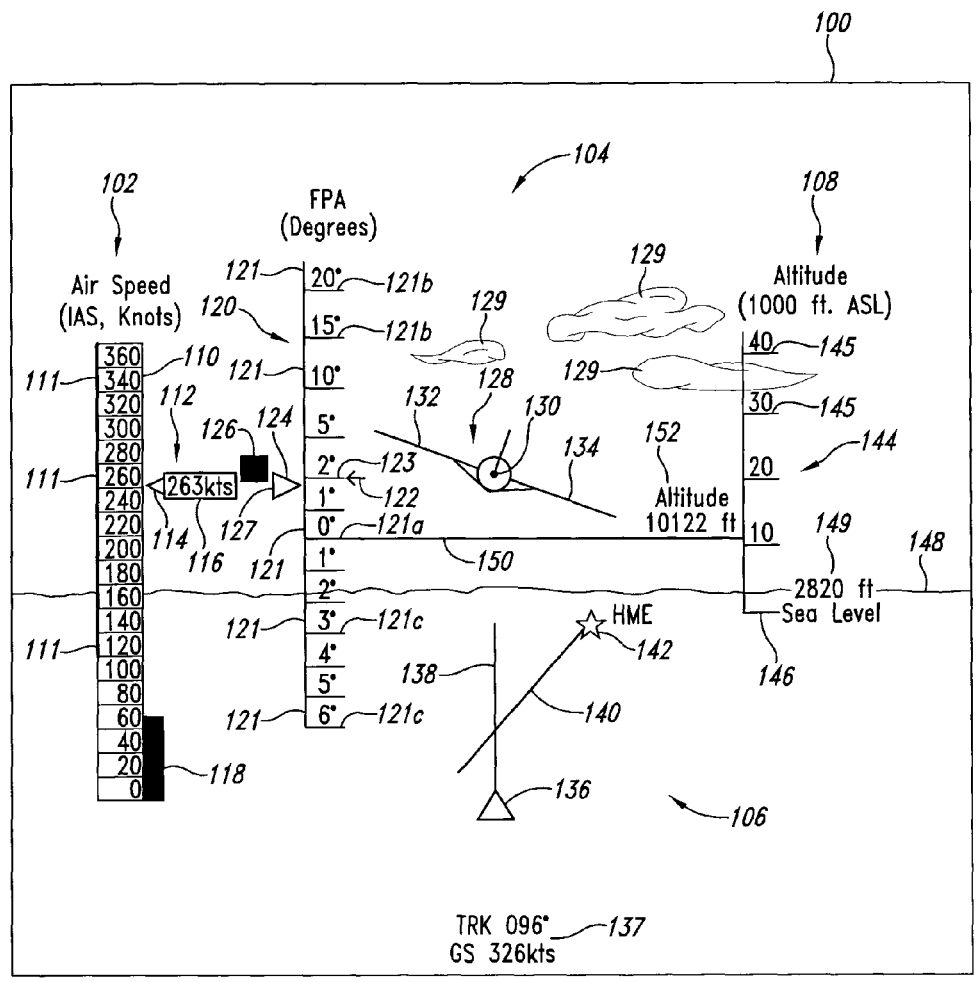
FIG. 1 is a schematic of an implementation of a flight situation display embodying aspects of the present invention.

An implementation of the flight situation presentation system according to the present invention is depicted as a flight situation display 100 shown in FIG. 1 as having an indicated airspeed (IAS) area 102, a flight path angle (FPA) area 104, a navigation area 106, and an altitude area 108. The flight situation display 100 is generated through conventional computer science techniques from a computer program based in software, firmware, and/or hardware, receiving measured, stored, and/or generated data to be displayed on a computer controlled display screen either in an aircraft using measured flight aircraft data such as barometric and gyroscopic measurements, global positioning system (GPS) data, and stored navigation data further discussed below or in a simulation or gaming environment such as with a flight simulator or workstation using computer stored and generated data such as based upon a flight simulation or gaming computer program. The IAS area 102 contains an IAS scale 110 vertically oriented in the flight situation display 100 with IAS demarcations 111 indicating a particular IAS of the aircraft. As is conventionally known, IAS is generally lower in value than true airspeed due to the decrease in air density with increase in altitude. An IAS indicator 112 has an IAS pointer 114 that points to a particular position on the IAS scale 110 and a IAS readout 116 that displays the numerical value of the particular IAS of the aircraft. The IAS of the aircraft is determined and presented numerically in high resolution as the IAS indicator 112. Adjacent to the lower end of the IAS scale 110 is a vertically oriented unsafe IAS warning bar 118, which indicates a lower range of IAS to be avoided due to safety concerns.

The FPA area 104 includes a FPA scale 120 with FPA demarcations 121 used along with indicators described below to indicate the FPA of the aircraft. A zero FPA demarcation 121a is located approximately in the middle of the FPA scale 120 with positive FPA demarcations 121b on the FPA scale positioned above the zero FPA demarcation generally associated with a positive FPA of the aircraft. Negative FPA demarcations 121c positioned on the FPA scale 120 below the zero FPA demarcation 121a are generally associated with a negative FPA of the aircraft.

A first ground-referenced vertical FPA indicator (ground FPA arrow) 122 is positioned along the right side of the FPA scale 120 and is represented in the depicted implementation as an arrow pointing to a position on the FPA scale to indicate FPA of the aircraft relative to the ground. FPA of the aircraft relative to the ground is determined and graphically rendered to form the novel ground FPA arrow 122 by known methods of aeronautics and computer science. For instance, FPA of the aircraft relative to the ground can be typically determined in the implementations based upon ground speed of the aircraft obtained by global positioning system (GPS) data and rate of climb/descent calculations from GPS or barometric data. In the case of FIG. 1, vertical FPA of the aircraft relative to the ground is a positive 2° such that the aircraft is climbing as indicated by the ground FPA arrow 122 adjacent the 2° FPA demarcation 123. Positioning of the ground FPA arrow 122 at the zero degree FPA demarcation 121a indicates level flight of the aircraft at constant altitude.

An air-mass referenced vertical FPA indicator (air FPA indicator) 124 is positioned along the left side of the FPA scale 120 and is represented in the depicted implementation as a triangle pointing to a position on the FPA scale to indicate FPA of the aircraft relative to the air mass. Air-mass referenced vertical FPA of the aircraft is determined and graphically rendered to form the novel air FPA indicator 124 by known methods of aeronautics and computer science. For instance, the implementations can typically determine airmass referenced vertical FPA based upon true airspeed and rate of climb/descent of the aircraft taken from GPS and barometric data. In the case of FIG. 1, the air FPA indicator 124 points to a location on the FPA scale 120 slightly below the two degree FPA demarcation 123 indicating that FPA of the aircraft relative to the air mass is slightly less positive than FPA of the aircraft relative to the ground indicating that the aircraft is subject to a headwind.

Figure 1A:
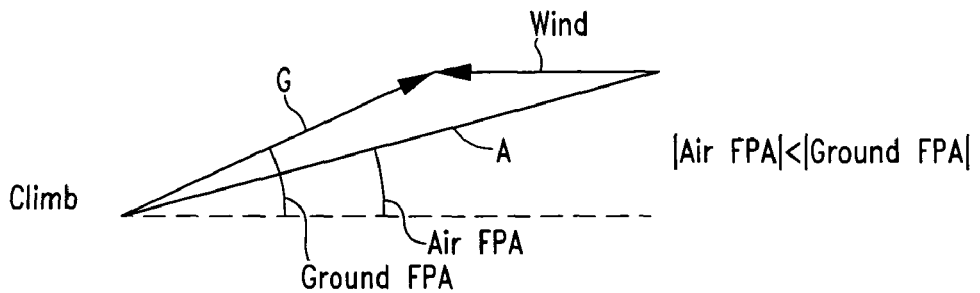
FIG. 1A is a vector diagram illustrating first order relationships of air FPA, ground FPA and wind.
Figure 1A:
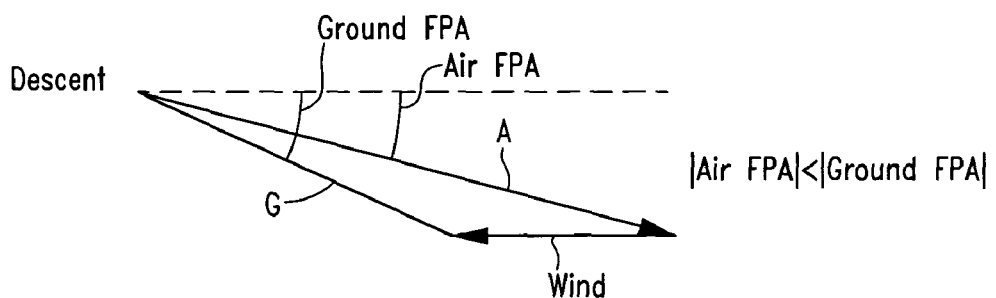
Figure 1A:
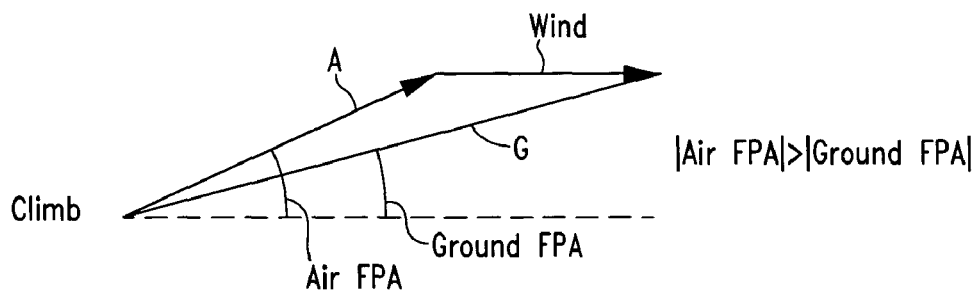
Figure 1A:
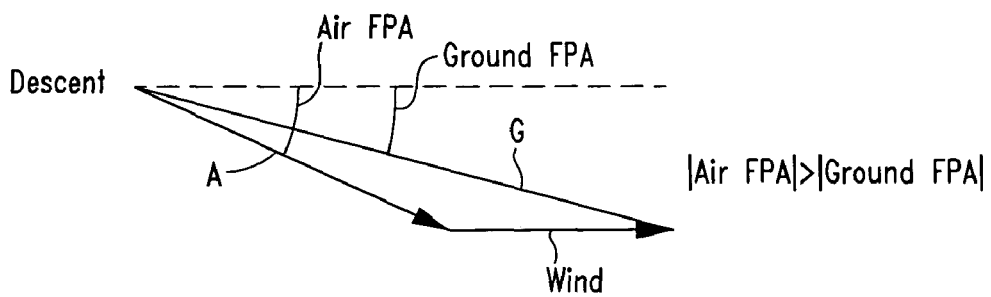

In general, the difference between vertical position of the ground FPA arrow 122 and the air FPA indicator 124 on the FPA scale 120 is due to wind. A first order vectoral depiction of the interrelationship between air FPA (represented by an angle between a reference horizontal axis to a vector labeled "A"), ground FPA (represented by an angle between the reference horizontal axis to a vector labeled "G"), and wind (represented by a vector labeled "wind" originating from the termination of the "A" vector and terminating at the termination of the "G" vector) is shown in FIG. 1A. As depicted for headwind conditions, the absolute value of air FPA is less than the absolute value of ground FPA both for both ascent and descent of the aircraft. As depicted for tailwind conditions, the absolute value of air FPA is greater than the absolute value of ground FPA for both ascent and descent of the aircraft.

As an example of how wind influences FPA displayed on the flight situation display 100, for descent, a tailwind condition is indicated when the ground FPA arrow 122 is higher in vertical position than the air FPA indicator such as when the ground FPA arrow indicates a more positive FPA or a less negative FPA than indicated by the air FPA indicator. Furthermore, for descent, a headwind condition is indicated when the ground FPA arrow 122 is lower in vertical position than the air FPA indicator such as when the ground FPA arrow indicates a less positive FPA or a more negative FPA than indicated by the air FPA indicator. In the depicted implementation, vertical position of the IAS scale 110 is adjusted such that the IAS readout 116 of the IAS indicator 112 is horizontally in line with the vertical side 127 of the air FPA indicator 124 to assist in visually integrating the IAS area 102 with the FPA area 104.

A potential air-mass referenced vertical FPA indicator (potential air FPA indicator) 126 is positioned to move in a vertical lane adjacent the vertical lane in which the air FPA indicator 124 moves and is represented in the depicted implementation as a square with sides equal to the vertical side 127 of the air FPA indicator 124. The potential air FPA indicator 126 is positioned to indicate the amount of power being expended at a current thrust setting of the aircraft at the current airspeed. Potential air FPA of the aircraft is determined and graphically rendered to form the novel potential air FPA indicator 126 by known methods of aeronautics and computer science. For instance, the implementations typically determine potential FPA of the aircraft based upon airspeed of the aircraft and rate of acceleration/deceleration of the aircraft along the air-mass referenced FPA of the aircraft. As is known, in the instance that the current power output of an aircraft is larger than required to maintain the current FPA and airspeed of the aircraft relative to the air mass, the aircraft will accelerate. This condition is shown in FIG. 1 with the potential air FPA indicator 126 positioned slightly higher on the FPA scale 120 than the air FPA indicator 124. Other situations involving positioning of the potential air FPA indicator 126 will be further discussed below.

An aircraft symbol 128 shown flying in graphically represented clouds 129 is positioned along side of the FPA scale 120 such that a second ground-referenced vertical FPA indicator (ground FPA dot) 130 is horizontally in line with the ground FPA arrow 122. Similar to generation of the ground FPA arrow 122, ground FPA of the aircraft is determined and graphically rendered to form the novel ground FPA dot 130 by known methods of aeronautics and computer science. Consequently, vertical positioning of the aircraft symbol 128 on the flight situation display 100 is dependent upon degree of aircraft FPA relative to the ground. The aircraft symbol 128 further includes a port wing 132 and a starboard wing 134 used to indicate roll or banked attitude of the aircraft in a conventionally known "outside-in" fashion. The banked attitude of the aircraft is determined and graphically displayed with the aircraft symbol 128 relative to a fixed horizon by known methods of aeronautics and computer science. For instance, amount of roll can be typically determined by the implementations through use of a gyroscope.

The navigation area 106 includes an aircraft navigation position indicator 136 represented by a triangle symbol and a readout 137 showing the aircraft's track reading (TRK) in degrees and ground speed (GS) in knots. Position, track and ground speed are determined and graphically rendered by known methods of aeronautics and computer science. For instance, the implementations can typically determine position, track, and ground speed of the aircraft from GPS data. A tip of the triangle symbol of the aircraft navigation position indicator 136 is positioned on the flight situation display 100 vertically in line with a wings level predictive track line 138 also on the navigation area 106. The vertical position of the aircraft navigation position indicator 136 is related to the altitude of the aircraft. When the aircraft is at a relatively high altitude, the aircraft navigation position indicator 136 will be near the lower portion of the navigation area 106. Conversely, when the aircraft is about to land, the aircraft navigation position indicator 136 will be near the top portion of the navigation area 106. The wings level predictive track line 138 indicates a path over the ground that the aircraft would take if its wings were kept level during flight. Wind would make the aircraft heading differ somewhat from the track. The wings level predictive track line 138 remains vertically oriented as shown, so whenever the aircraft turns, the positions of any destination waypoints or other indicators displayed on the navigation area 106 are rotated about the aircraft position indicator 136 accordingly. In turn, the wings level predictive track line 138 is vertically aligned on the flight situation display 100 with the ground FPA dot 130, being the center of the aircraft symbol 128. The vertical alignment of the aircraft symbol 128 with the aircraft navigation position indicator 136 and the wings level predictive track line 138 helps to visually integrate the FPA area 104 with the navigation area 106.

The navigation area 106 further includes an inbound course line 140, which is typically a known flight path to an enroute waypoint a destination, such as an airport, indicated by a destination waypoint 142 in the form of a star in the depicted implementation. The navigation area 106 may also display symbols indicating waypoints along the flight path to the destination waypoint 142. In further implementations, the navigation area 106 shows further details of terrain and other geography. The aircraft navigation position indicator 136 and wings level predictive track line 138 can be displayed over the details of terrain and other geography so that the pilot has an awareness of the aircraft's position relative to the terrain and projected track. Position data associated with the destination waypoint 142, waypoints, and details of terrain and other geography are stored in a database to be rendered for graphical presentation in a conventionally known manner.

The altitude area 108 includes an altitude scale 144 with altitude demarcations 145 used to indicate present altitude of the aircraft. A sea level demarcation 146 is located at the vertical bottom of the altitude scale 144 under a terrain line 148, which is part of the navigation area 106. The terrain line 148 is horizontally positioned on the flight situation display 100 according to the altitude demarcations 145 of the altitude scale 144. A terrain elevation numerical readout 149 indicates elevation of the terrain immediately below the aircraft at the location indicated by the aircraft navigation position indicator 136 based upon terrain data stored in a database in a conventional manner. The positioning of the terrain line 148 and sea level demarcation 146 helps to visually integrate the navigation area 106 with the altitude area 108.

The altitude scale 144 is vertically positioned so that the zero FPA line 150 horizontally extending rightward from the zero FPA demarcation 121a touches on the left side of the altitude scale at a point on the altitude scale indicating the present altitude of the aircraft. Altitude of the aircraft is determined and graphically rendered in the novel altitude area 108 by known methods of aeronautics and computer science. For instance, the implementations can typically determine altitude from either barometric or enhanced GPS data. Vertical positioning of the FPA scale 120 and the altitude scale 144 and extension of the zero FPA line 150 from the FPA scale 120 to the altitude scale 144 thus helps to visually integrate the FPA area 104 with the altitude area 108 on the flight situation display 100. The altitude area 108 further includes a present altitude readout 152 positioned above the zero FPA line 150 providing further visual display to confirm present altitude of the aircraft.

In some implementations, pitch attitude data of the aircraft is determined typically through use of a gyroscope and is used to quicken presentation of various flight data indicators. For instance, when the air-mass referenced vertical FPA and ground referenced vertical FPA changes, the determined change in pitch attitude is used instead of the determined change in measured air FPA and ground FPA for the first one or two seconds to display changes indicated by the ground FPA arrow 122, the ground FPA dot 130, and the air FPA indicator 124. A very short time after a change of pitch attitude of the aircraft, typically in a smooth manner, the measured FPAs will take over influence of how the FPA indicators are displayed. This use of measured changes in pitch attitude to quicken presentation of the FPA indicators is due to a conventionally recognized phenomena of a general lag in measured FPA values relative to change in aircraft flight generally attributed to FPA indicators. Lag in measurement of FPA values during change of FPA is more drastic at lower airspeeds of the aircraft. Consequently, the amount of quickening of the presentation of FPA during FPA change through use of change in pitch attitude measurement is adjustable dependent upon airspeed of the aircraft.

Figure 2:
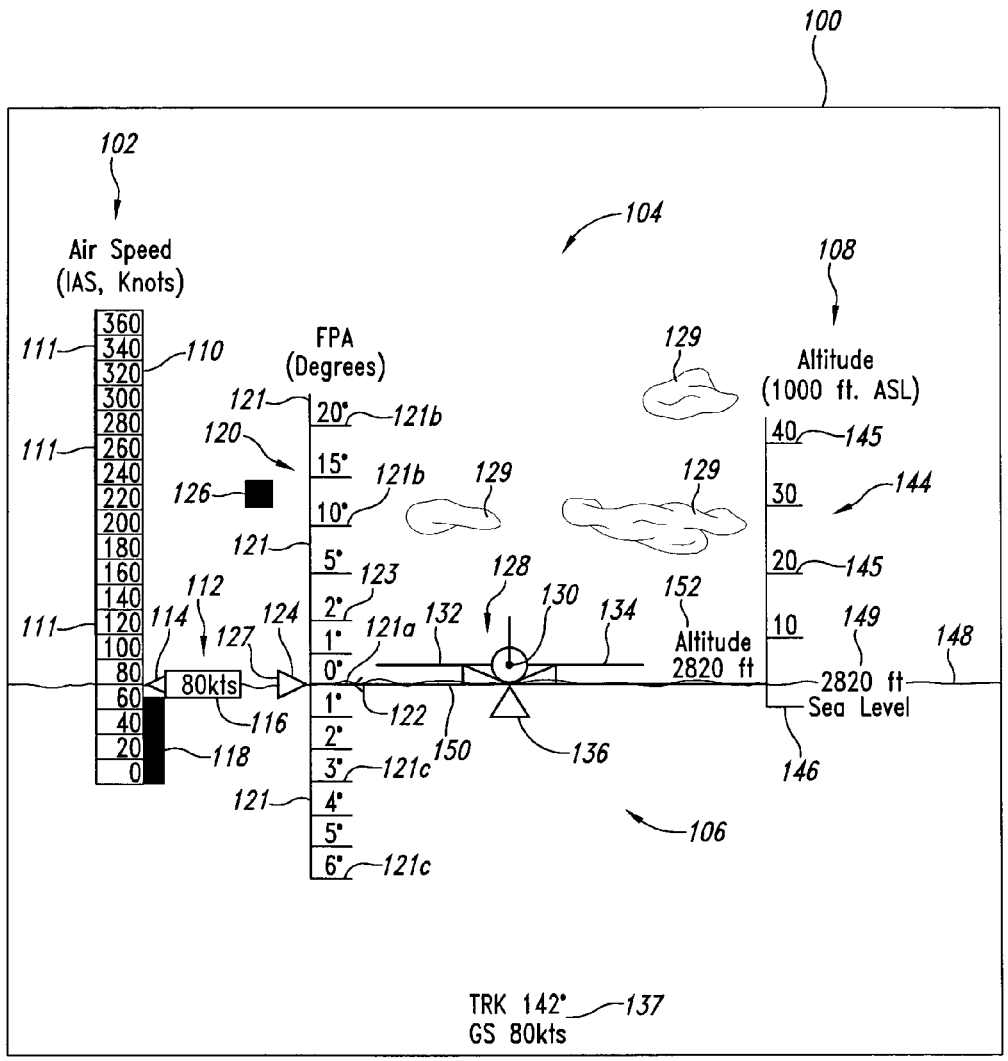
FIG. 2 is a schematic of the flight situation display of FIG. 1 depicted when the associated aircraft is on a takeoff roll.

The flight situation display 100 depicted in FIG. 2 indicates that the aircraft is in a takeoff roll where the air FPA indicator 124 is vertically positioned in line with the zero FPA demarcation 121a and the potential air FPA indicator 126 is positioned approximately in line with one of the positive FPA demarcations 121b associated with a positive 13 degree FPA angle. The positive 13 degree FPA angle difference between the potential air FPA indicator 126 and the air FPA indicator 124 indicates the degree of the aircraft's acceleration on the takeoff ground run in terms of air-mass referenced vertical FPA. This display feature will serve as an effective takeoff monitor for the pilot of the aircraft. As the aircraft becomes airborne, the maximum air-mass referenced vertical flight path climb angle is shown for the particular power setting and acceleration of the aircraft.

Figure 3:
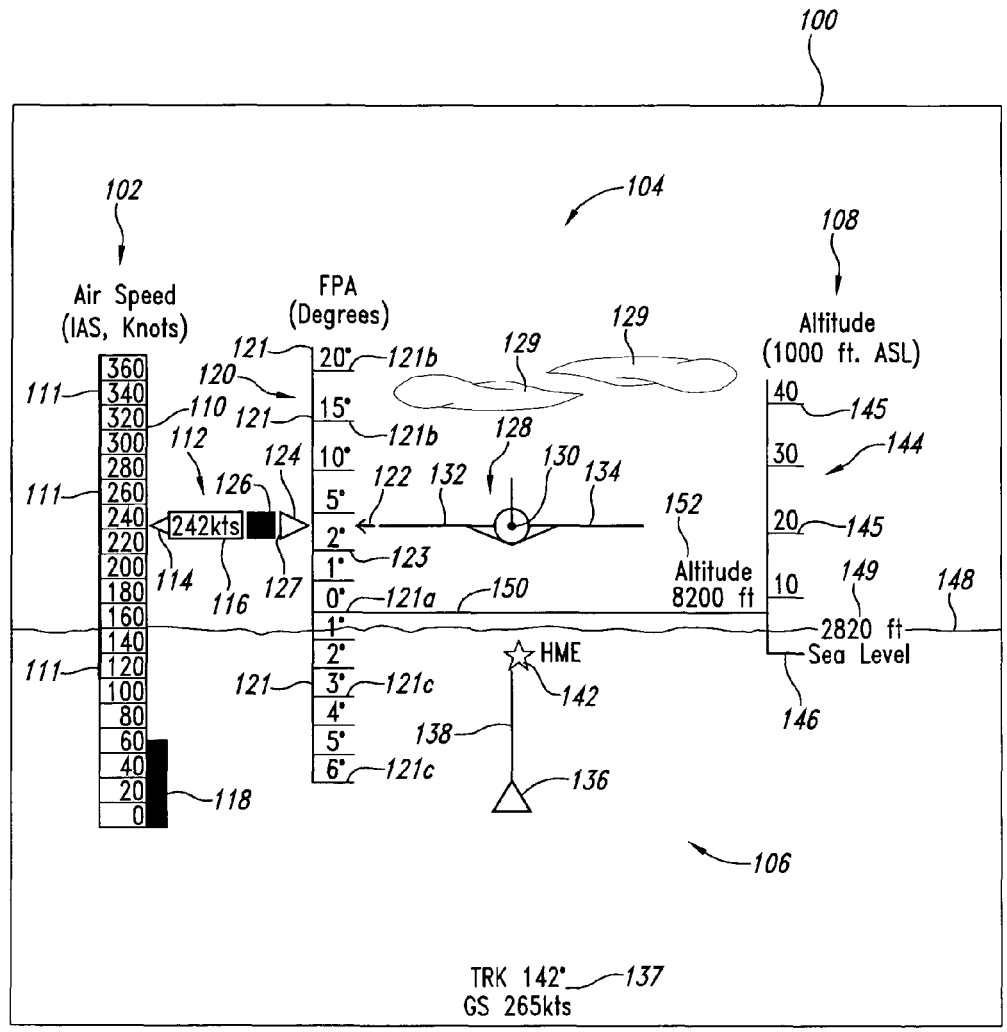
FIG. 3 is a schematic of the flight situation display of FIG. 1 depicted when the associated aircraft is in an initial stabilized climb after takeoff.

As shown in FIG. 3, as indicated by the air FPA indicator 124, the pilot has chosen a climb angle of slightly less than a positive 3° for the air-mass referenced vertical FPA. The potential air FPA indicator 126 indicates that the pilot has reduced the power of the aircraft to maintain a constant airspeed since the potential air FPA indicator is horizontally in line with the air FPA indicator 124. The IAS readout 116 of the IAS indicator 112 shows that the aircraft is traveling at an IAS of 242 knots for the climb. Since the ground FPA arrow 122 is indicating the same FPA angle as the air FPA indicator 124, the aircraft is experiencing negligible wind conditions.

Figure 4:
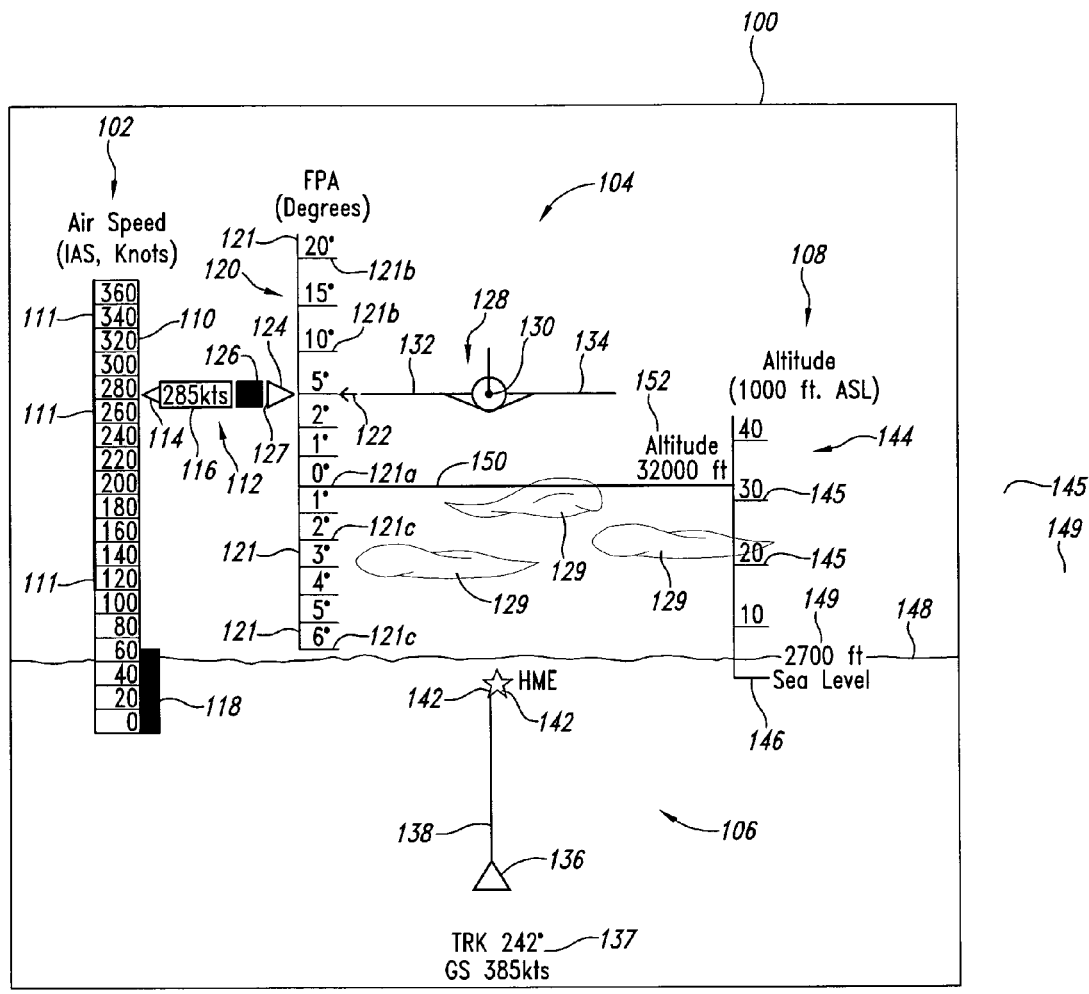
FIG. 4 is a schematic of the flight situation display of FIG. 1 depicted when the associated aircraft is continuing to climb through 32,000 ft. altitude.
Figure 5:
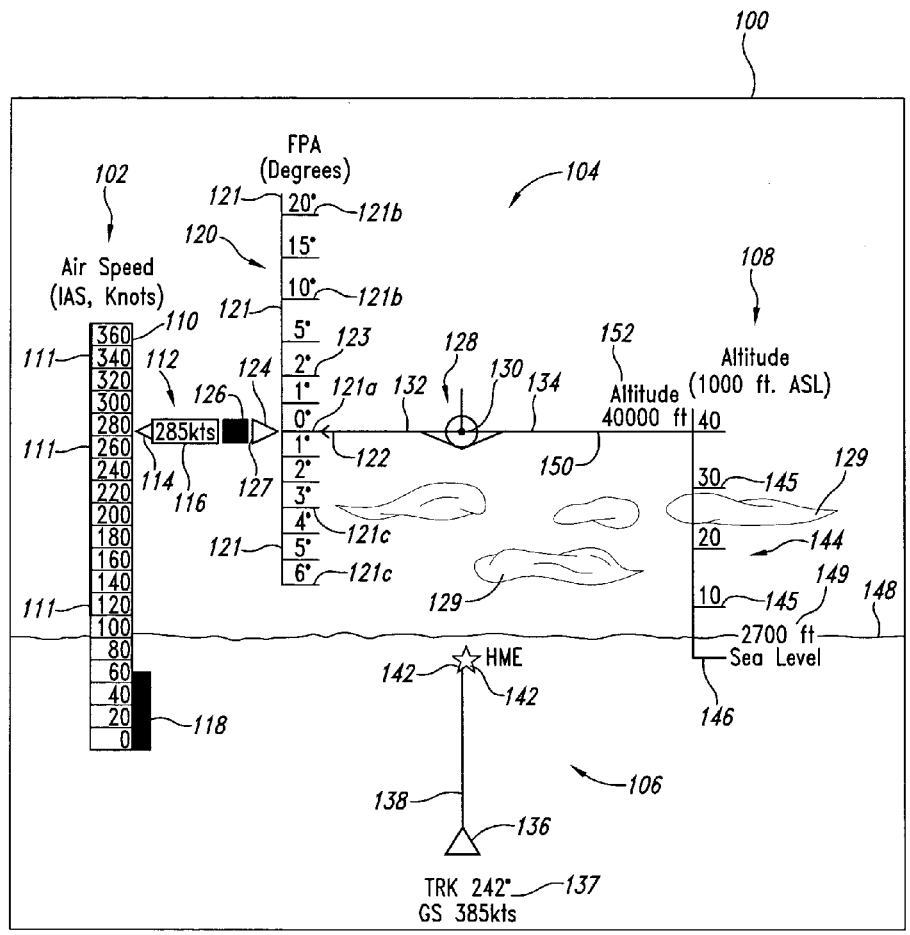
FIG. 5 is a schematic of the flight situation display of FIG. 1 depicted when the associated aircraft is in level flight at 40,000 ft. altitude.

In FIG. 3, the zero FPA demarcation 121a extends to the altitude scale 144 to indicate along with the present altitude readout 152 that the aircraft's altitude is presently at 8,200 ft. In FIG. 4, the zero FPA demarcation 121a and present altitude readout 152 indicate that the aircraft is climbing through an altitude of 32,000 ft. The IAS indicator 112 shows an IAS of 285 knots. Since the potential air FPA indicator 126 and the air FPA indicator 124 at the same vertical position, this 285 knot IAS of the aircraft is constant. In FIG. 5, both the air FPA indicator 124 and the potential air FPA indicator 126 are at the zero FPA demarcation 121a indicating that the aircraft is flying level flight at a constant airspeed at 40,000 ft. altitude and the presence of wind is not apparent in the level flight condition.

Figure 6:
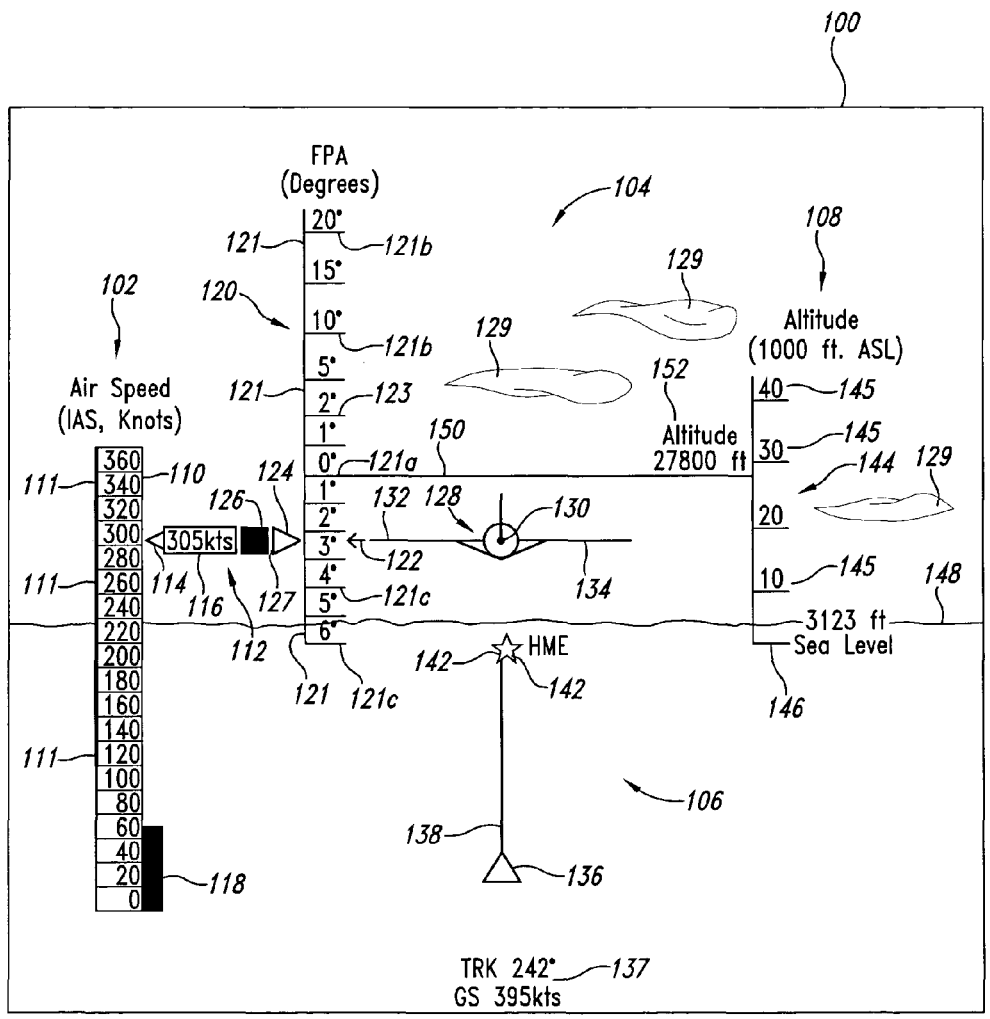
FIG. 6 is a schematic of the flight situation display of FIG. 1 depicted when the associated aircraft is in descent through 27,800 ft. altitude.
Figure 7:
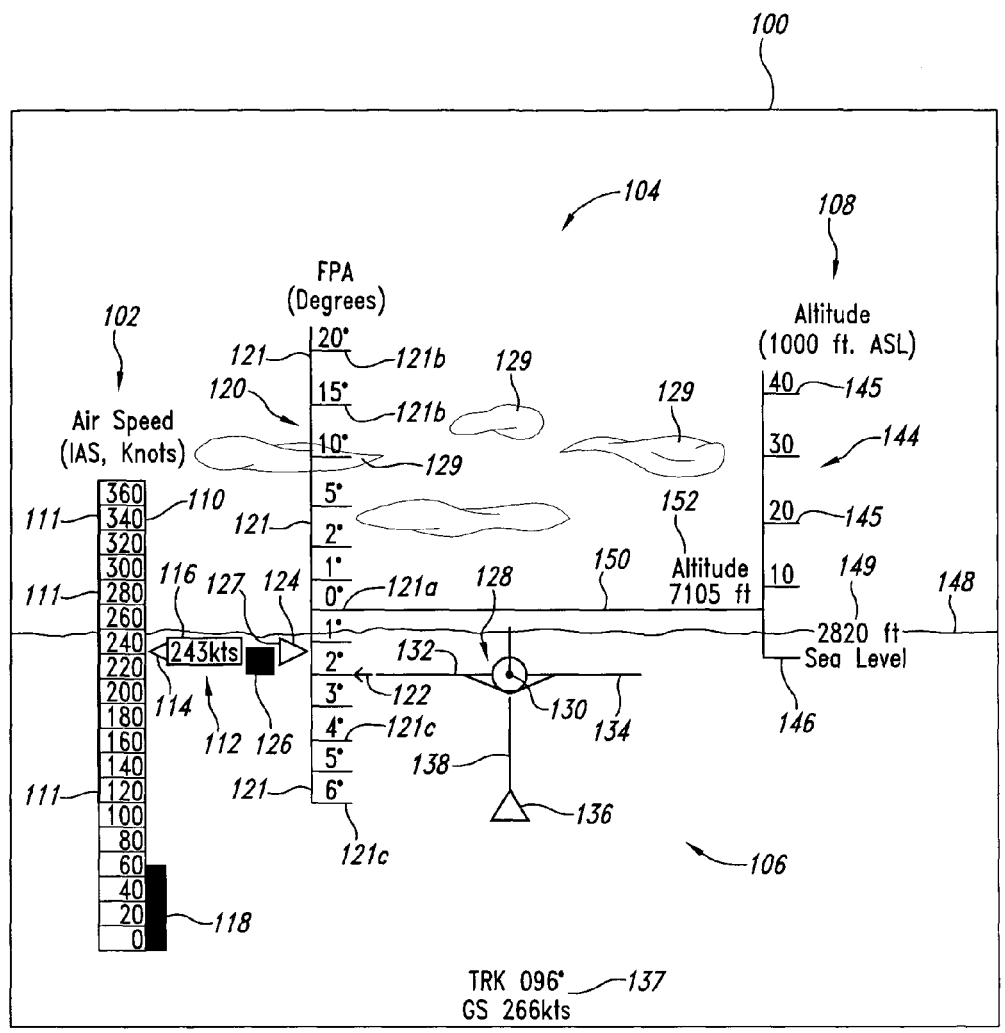
FIG. 7 is a schematic of the flight situation display of FIG. 1 depicted when the associated aircraft is in descent through 7,105 ft. altitude.

FIG. 6 shows the flight situation display 100 of the aircraft as it descends through an altitude of 27,800 ft. The aircraft has a constant 305 knot IAS and a negative air-mass referenced vertical FPA a bit greater than 2° and is experiencing negligible wind conditions. In FIG. 7, the aircraft is descending at an air-mass referenced vertical FPA of a bit more than 1° with a present IAS of 243 knots at a present altitude of 7105 ft. The aircraft is decelerating since the potential air FPA indicator 126 has a lower vertical position than the air FPA indicator 124. The air FPA indicator 124 is indicating a smaller negative FPA than the ground FPA arrow 122 so the aircraft is experiencing noticeable head wind conditions.

Figure 8:
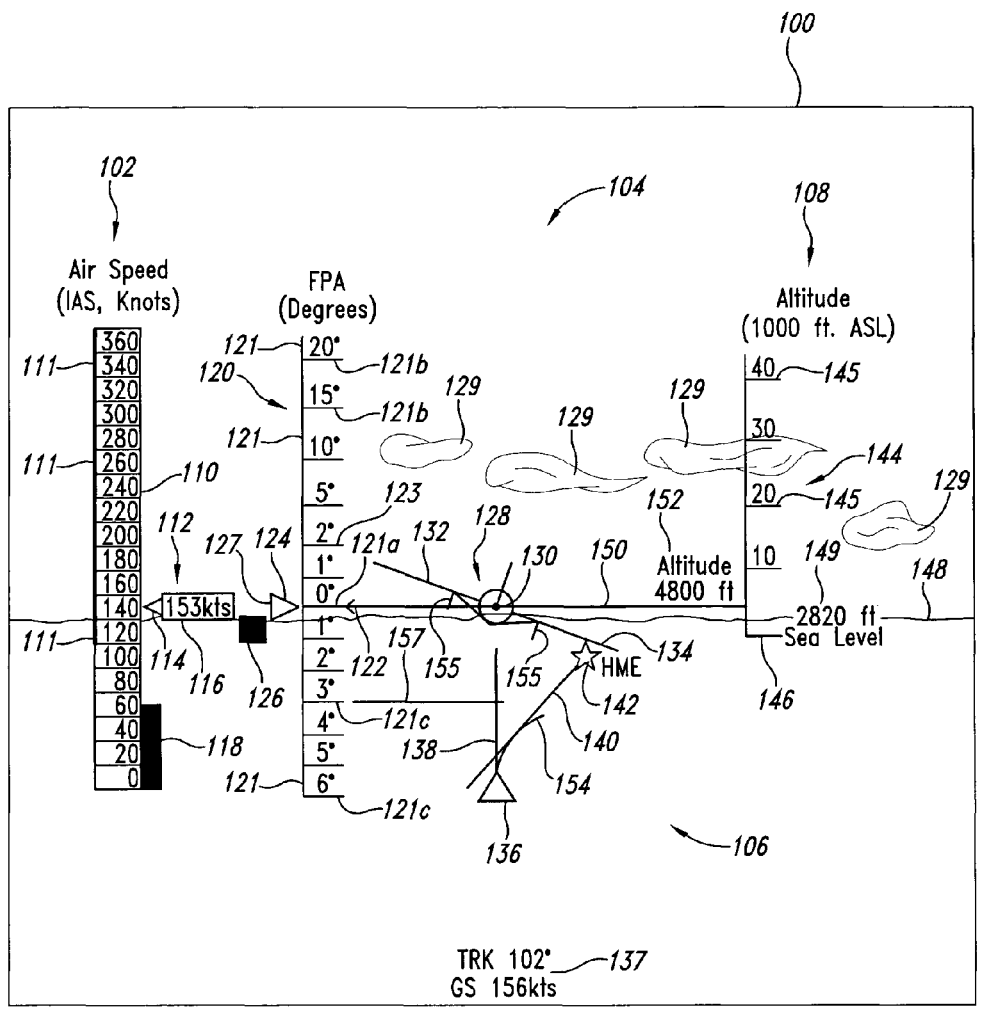
FIG. 8 is a schematic of the flight situation display of FIG. 1 depicted when the associated aircraft is turning inbound to an airport.

In FIG. 8, the aircraft is decelerating at a present IAS of 153 knots at level flight at an altitude of 4,800 ft. A banked wings predictive track 154 of the navigation area 106 shows a predictive track of the aircraft in relation to the inbound course line 140 as the aircraft banks right as indicated by the aircraft symbol 128. For the case depicted in FIG. 8, the banked wings predictive track 154 is helping the pilot direct the aircraft to make a tangential capture of the inbound course to the waypoint 142 labeled HME as indicated by the inbound course line 140. The aircraft symbol also includes a gear down indicator 155 as part of the aircraft symbol showing the landing gear of the aircraft symbol as being fully deployed. A user selectable approach indicator 157 can be activated and positioned at a particular one of the FPA demarcations 121 (in the case depicted in FIG. 8, negative 3° ground referenced vertical FPA) of the FPA scale 120 by the pilot. At the time appropriate for landing the aircraft, the flight situation display will then alert the pilot visually (such as with the user selectable approach indicator 157 visibly flashing) and/or audibly (such as by a digitized voice announcing, "begin descent") to begin descent of the aircraft at the particular value of ground FPA indicated by the user selectable approach indicator 157.

Figure 9:
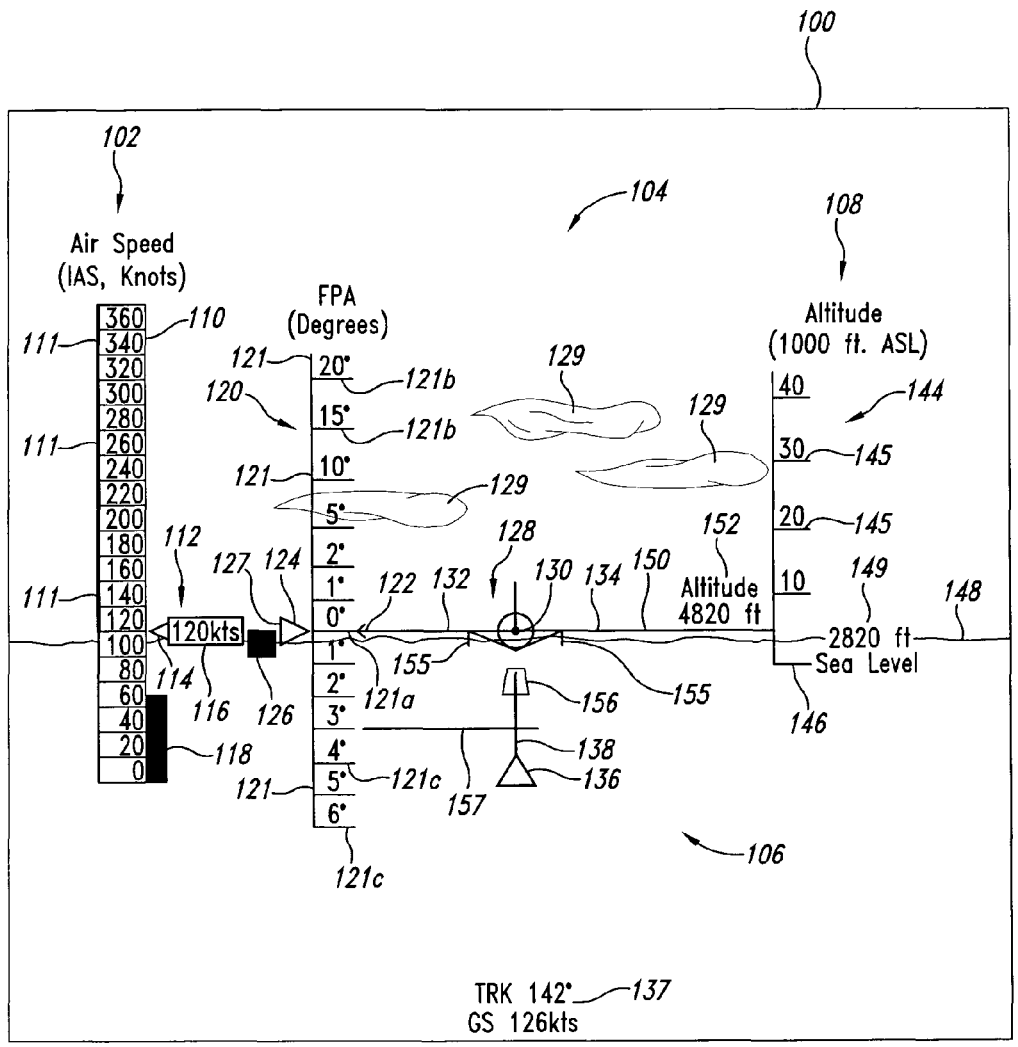
FIG. 9 is a schematic of the flight situation display of FIG. 1 depicted when the associated aircraft is approaching a three degree glide slope for landing at the airport.

In FIG. 9, the aircraft is at a 4,825 ft. altitude, 2000 ft above the ground, approaching a 3° glide slope (negative 3° ground referenced vertical FPA as indicated by the user selectable approach indicator 157) at a present level flight and a present IAS of 120 knots with slight deceleration. The aircraft is 2,000 ft. above the ground (difference between 4,820 ft. flight altitude and 2,820 ft. terrain altitude). The wings level predictive track line 138 is lined up with a runway symbol 156 also shown in the navigation area 106. Once the aircraft is close enough, display of the destination waypoint 142 in the navigation area 106 ceases and the runway symbol 156 is displayed in a perspective view. Any time the runway symbol 156 is displayed, for a present position of the aircraft, the bottom edge of the runway symbol is horizontal in line with the particular one of the FPA demarcations 121 on the FPA scale 120 that corresponds with the ground referenced vertical FPA that the aircraft would need to descend on to reach the runway given the present position of the aircraft. As the aircraft flies level toward the destination runway, the runway symbol 156 moves downward showing that the FPA to the runway is becoming steeper. When the runway leading edge is abeam the 3 degree FPA (the depicted preselected approach FPA) the pilot will lower the aircraft nose, ease off some power and commence the approach down the 3 degree ground FPA.

Figure 10:
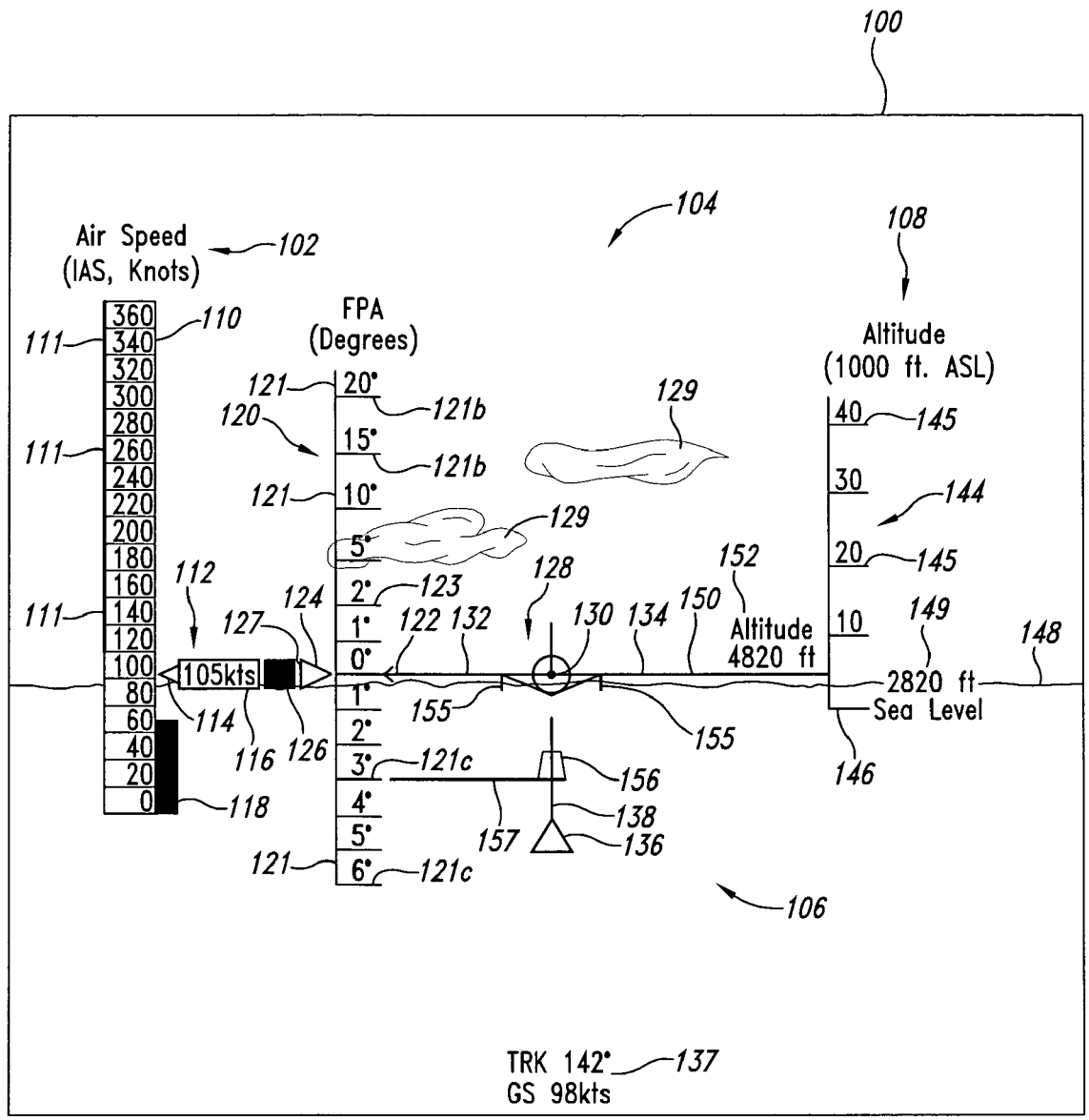
FIG. 10 is a schematic of the flight situation display of FIG. 1 depicted when the associated aircraft is arriving at the three degree glide slope for landing at the airport.

In FIG. 10, the bottom edge of the runway symbol 156 has just become horizontally in line with the user selectable approach indicator 157, thus the aircraft situation display 100 will alert the pilot to begin descent of the aircraft. In some implementations, this alert can come in the form of an audible alert containing the specific ground FPA to be used for the approach (in the depicted case, negative 3° ground referenced vertical FPA). As shown, the aircraft has arrived just prior to the start of the 3° glide slope abeam the end of the runway at a constant IAS of 105 knots and altitude of 4820 ft.

Figure 11:
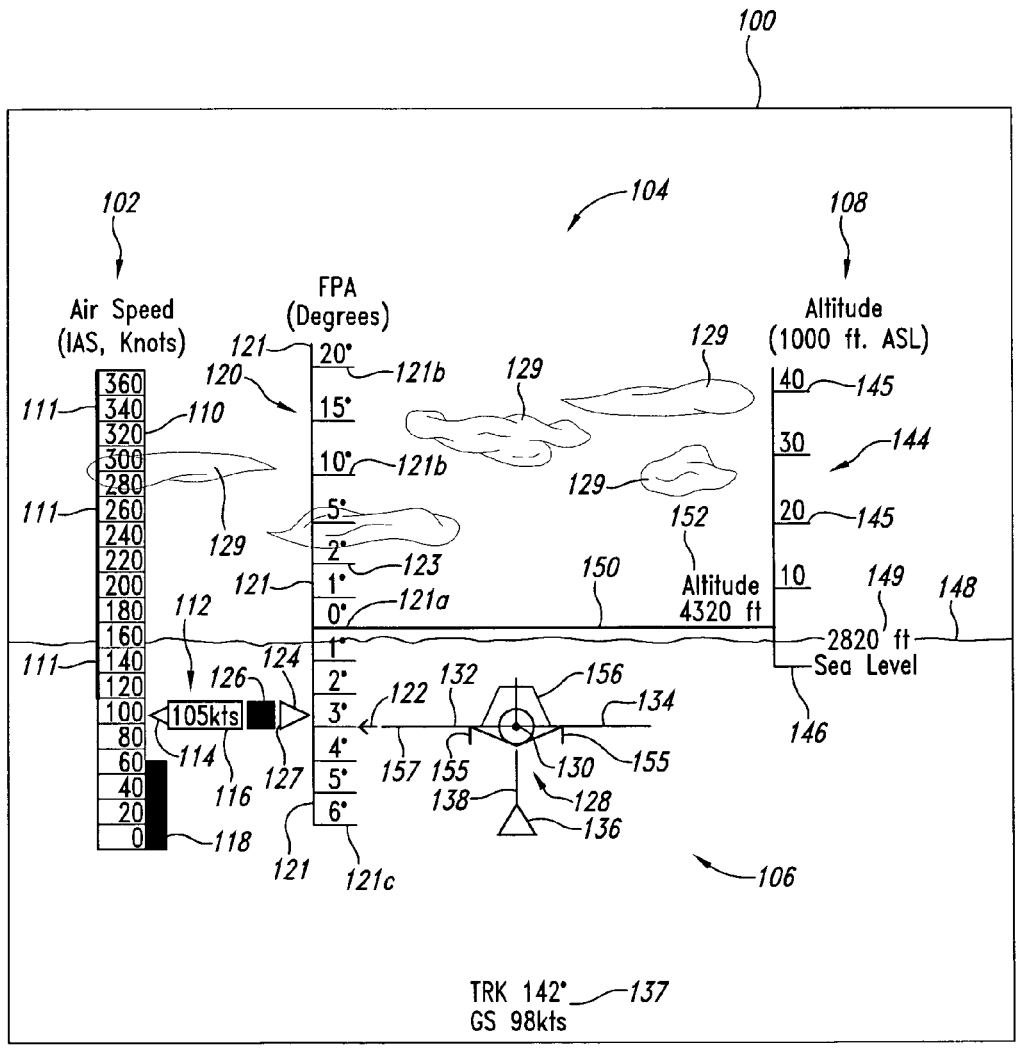
FIG. 11 is a schematic of the flight situation display of FIG. 1 depicted when the associated aircraft is continuing the final approach descent for landing at the airport.

In FIG. 11, the aircraft is starting the final approach descent at the ground FPA specified by the user selectable approach indicator 157 shown in FIG. 10. The aircraft is nosed down so that the ground FPA dot 130 of the aircraft symbol 128 is positioned in line with the near end of the runway symbol 156. The air FPA indicator 124 is between a negative 2° and 3° whereas the ground FPA arrow 122 is at a negative 3°, which is the angle of the glide slope. The air FPA indicator 124 shows a headwind (approximately 10–12 knots) since it indicates an air-mass referenced vertical FPA a little less then the negative 3° shown by the ground FPA arrow 122. The aircraft is stabilized on the approach at 1500 ft. above the runway as indicated by the difference between the altitude of the aircraft of 4320 ft. as shown by the present altitude readout 152 and the altitude of the terrain of 2820 ft. as shown by the terrain elevation numerical readout 149. A display that presents a flight path on final approach can be quite useful for even an experienced pilot both during the day and especially for night visual flight conditions. Frequently, the visual scene as viewed by the pilot without such a display to present flight path on final approach can be misleading to the pilot and can cause the pilot to incorrectly fly the aircraft at a dangerously low altitude below that required for safe conduct of the final approach.

Figure 12:
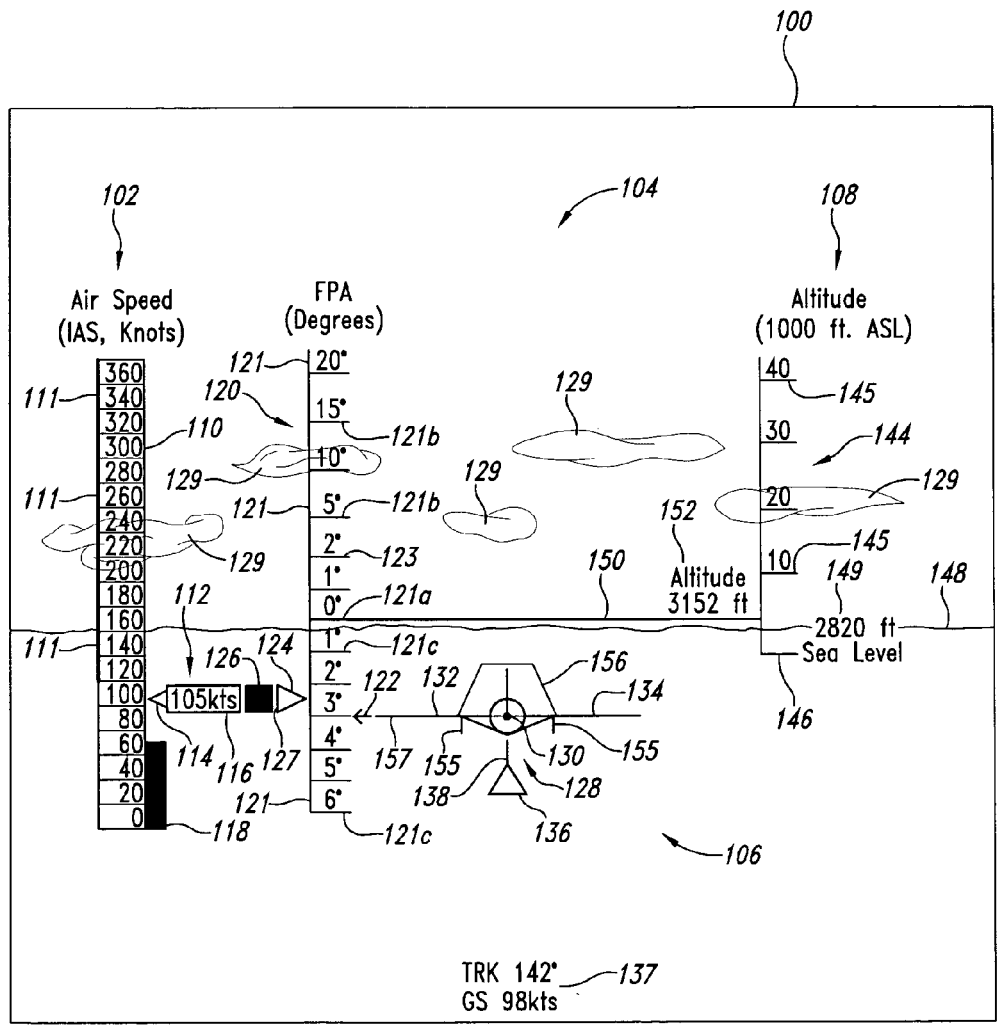
FIG. 12 is a schematic of the flight situation display of FIG. 1 depicted when the associated aircraft is on final approach 300 ft. above the runway of the airport.

In FIG. 12, the aircraft is continuing the 3° approach approximately 332 ft. above the runway. As shown, the aircraft navigation position indicator 136 is displayed in closer proximity to the aircraft symbol 128 than shown previously since the aircraft is close to the landing. The aircraft navigation position indicator 136 will join with the aircraft symbol 128 upon touchdown of the aircraft.

Figure 13:
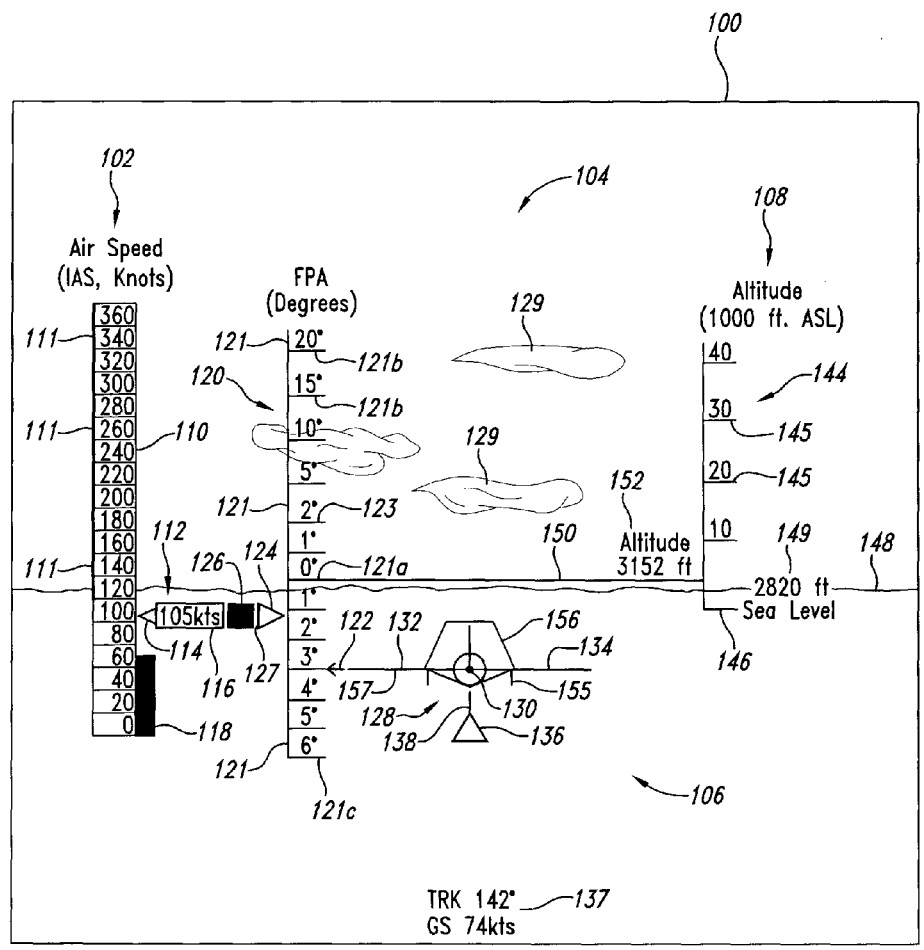
FIG. 13 is a schematic of the flight situation display of FIG. 1 depicted when the associated aircraft is on final approach for landing at the airport with a strong headwind.

The flight situation display 100 shown in FIG. 13 is associated with a final approach having a strong headwind since the air FPA indicator 124 is near negative 1° whereas the ground FPA arrow is at negative 3°. While flying the aircraft on final approach, the pilot maintains a stable speed of the aircraft by matching the vertical position of the potential air FPA indicator 126 with the vertical position of the air FPA indicator 124.

Figure 14:
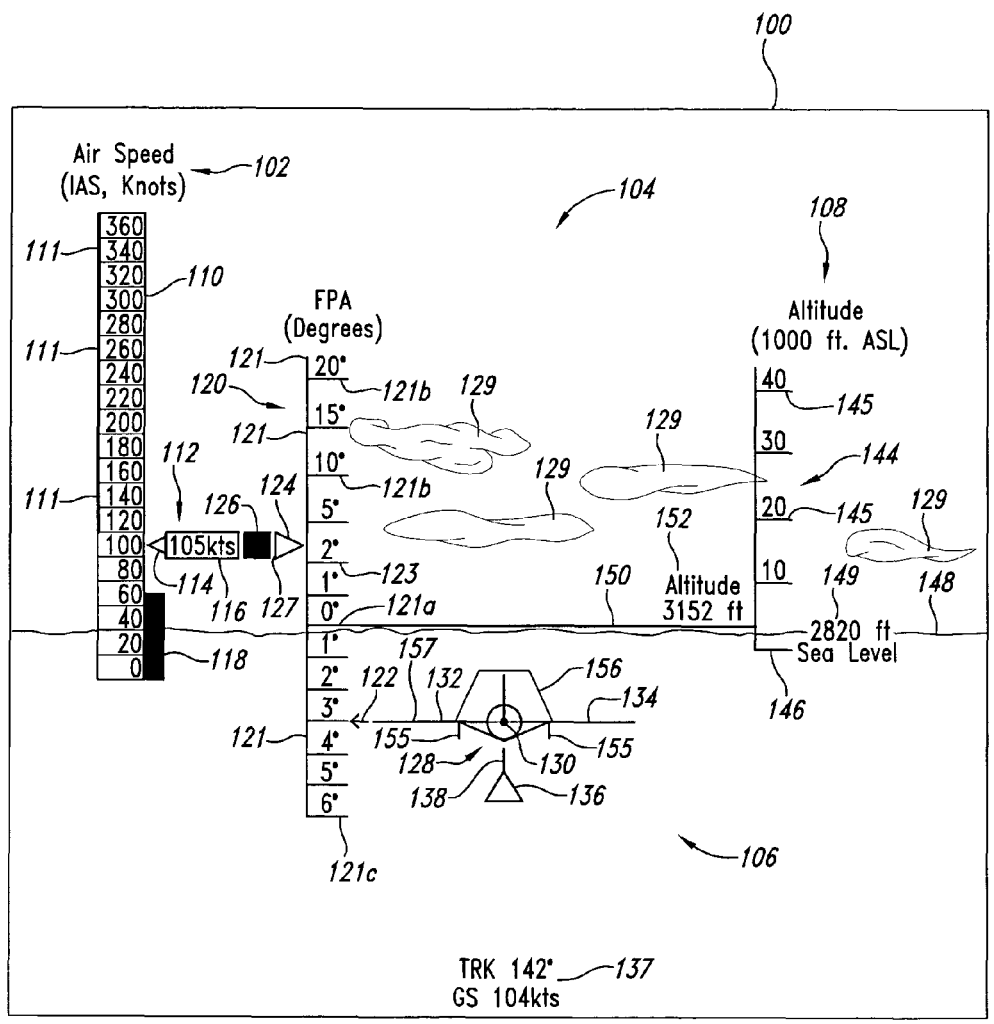
FIG. 14 is a schematic of the flight situation display of FIG. 1 depicted when the associated aircraft is on final approach for landing at the airport with a strong downburst occurring wherein aircraft power has been set to compensate.

A final approach with a strong down burst is portrayed by the flight situation display 100 shown in FIG. 14 since the air FPA indicator 124 is positioned above the positive FPA demarcation 121*b* of 2° whereas the ground FPA arrow 122 is positioned at the negative FPA demarcation 121*c* of 3°. This is an extreme flight situation in which the pilot will have to fly an air-mass referenced vertical FPA typically associated with an ascent of the aircraft to maintain a ground referenced vertical FPA of negative 3° as indicated by the ground FPA arrow 122. As in other less extreme situations, the pilot maintains a stable flight path of the aircraft by matching the vertical position of the potential air FPA indicator 126 with the vertical position of the air FPA indicator 124.

Figure 15:
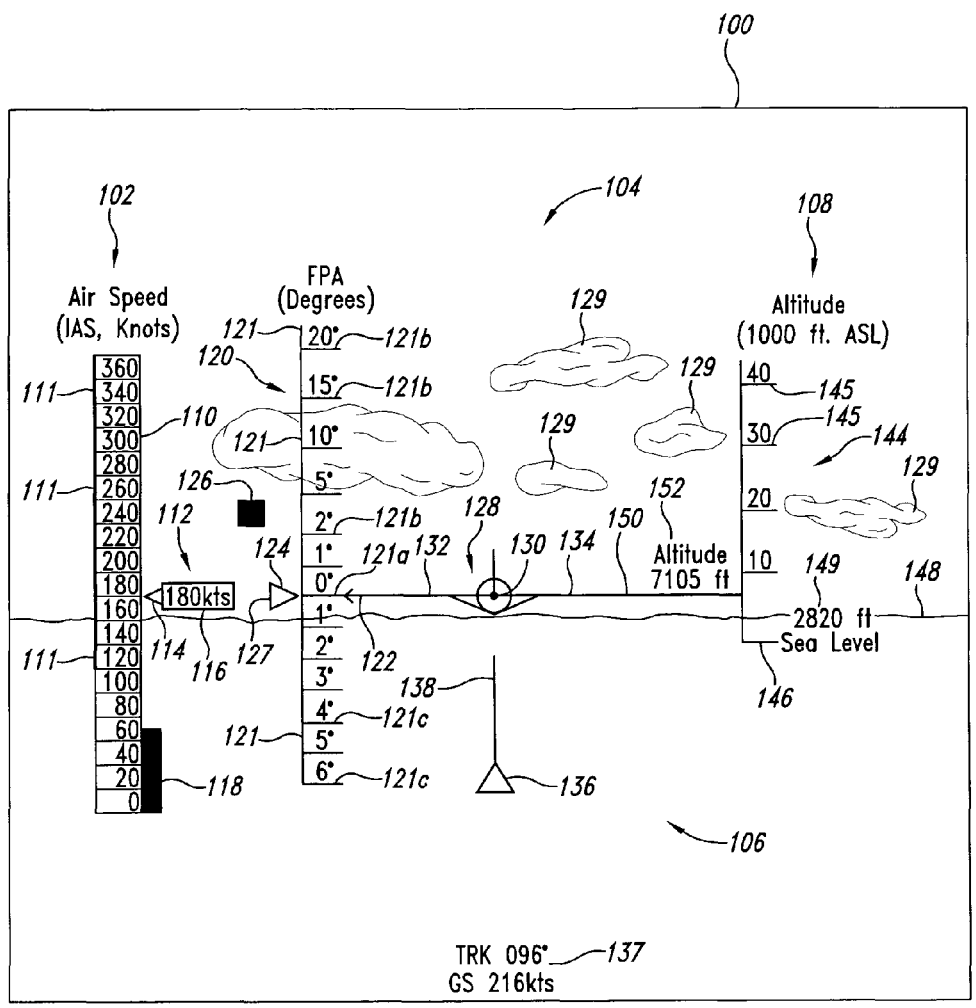
FIG. 15 is a schematic of the flight situation display of FIG. 1 depicted when the associated aircraft is accelerating in level flight.
Figure 16:
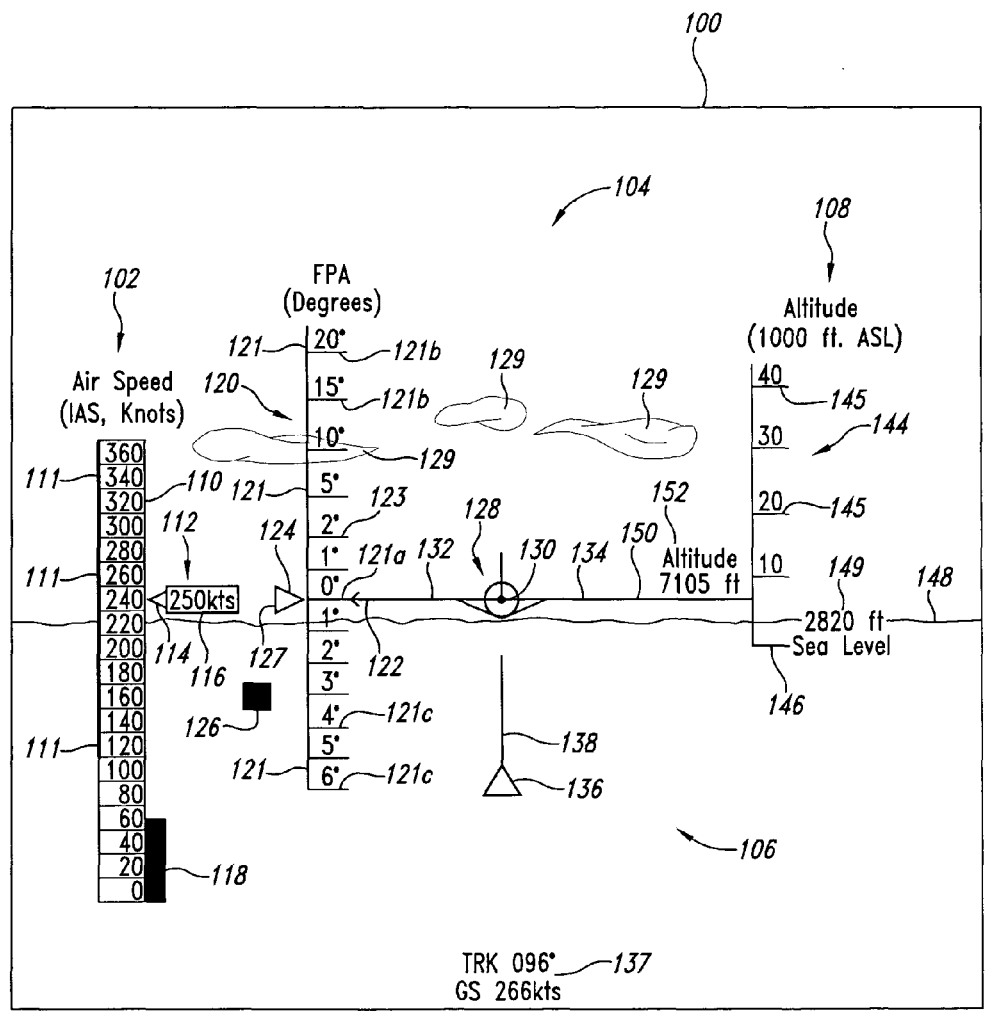
FIG. 16 is a schematic of the flight situation display of FIG. 1 depicted when the associated aircraft is decelerating in level flight.

Additional flight conditions are portrayed by the flight situation display 100 of FIGS. 15 and 16 showing an accelerating and decelerating aircraft, respectively, in level flight.

Figure 17:
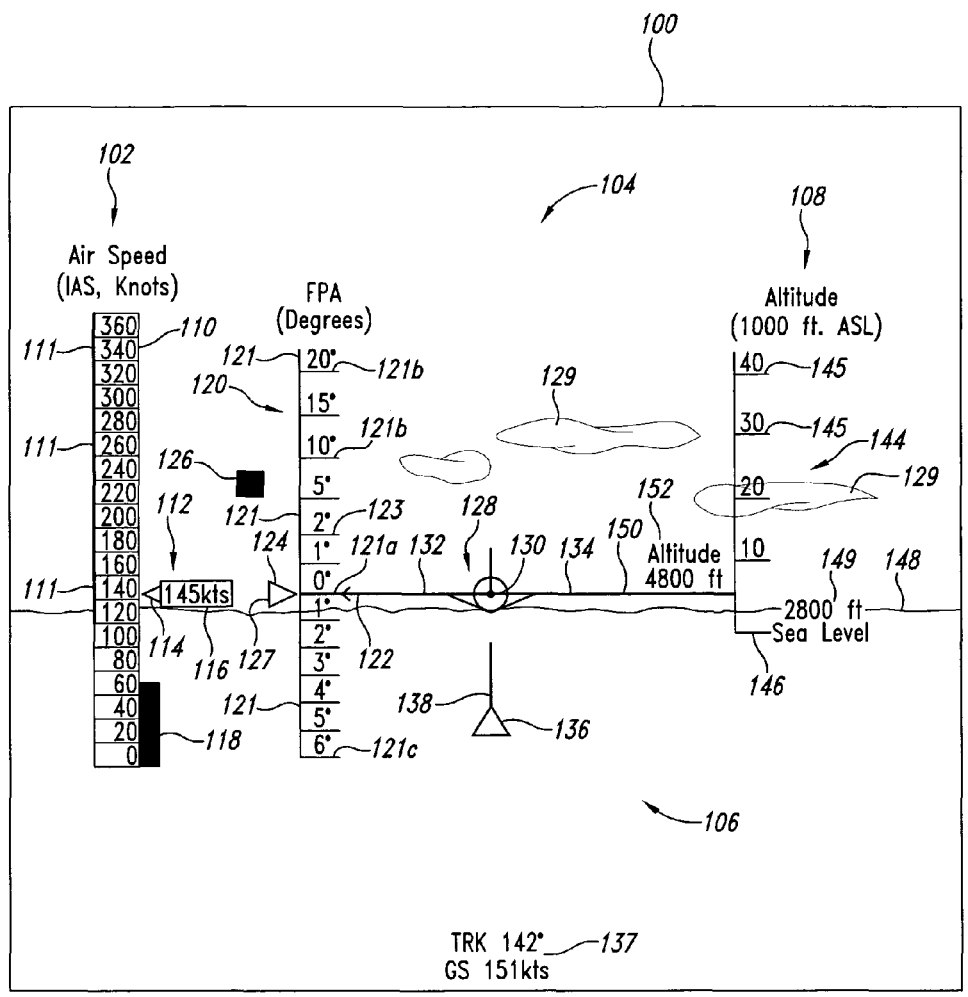
FIG. 17 is a schematic of the flight situation display of FIG. 1 depicted when the associated aircraft is flying level.
Figure 18:
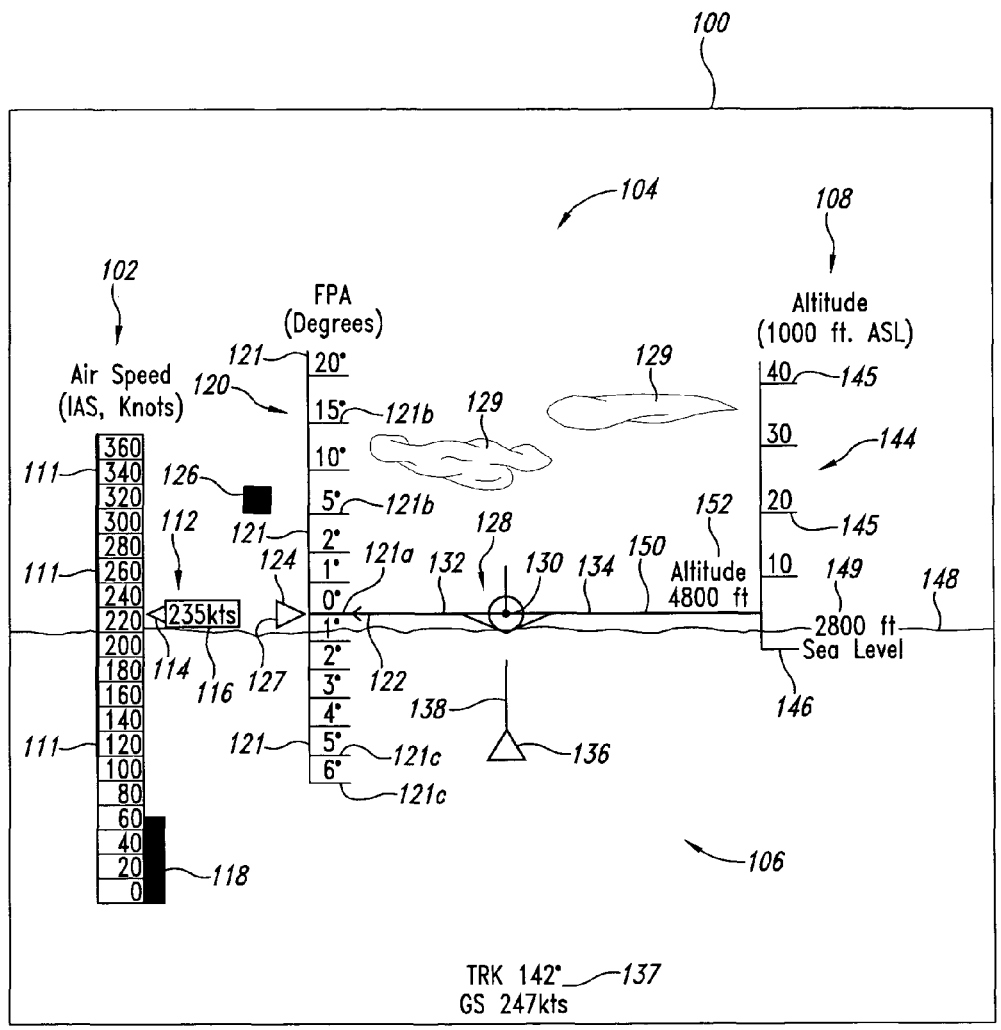
FIG. 18 is a schematic of the flight situation display of FIG. 1 depicted when the associated aircraft is flying with its power adjusted for accelerating in level flight.
Figure 19:
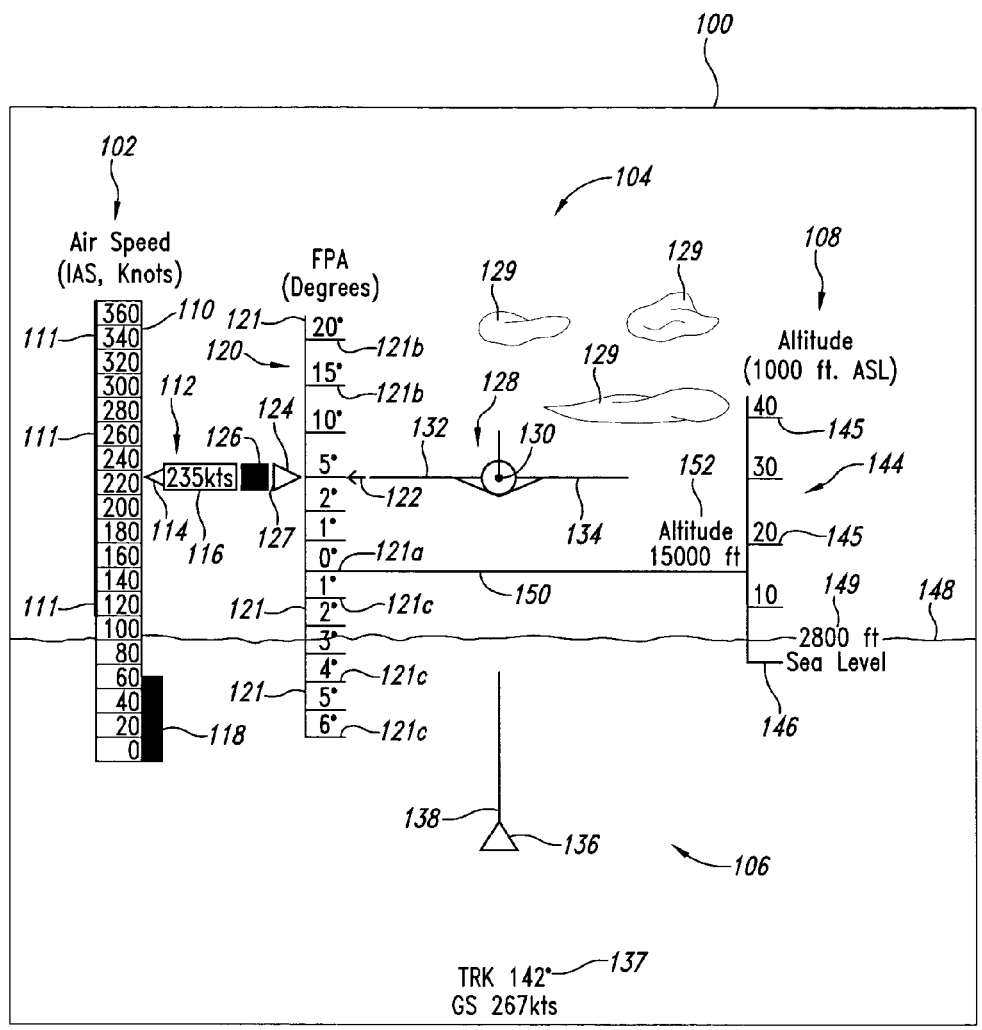
FIG. 19 is a schematic of the flight situation display of FIG. 1 depicted when the associated aircraft is stabilized and climbing through 15,000 ft. to a desired altitude.
Figure 20:
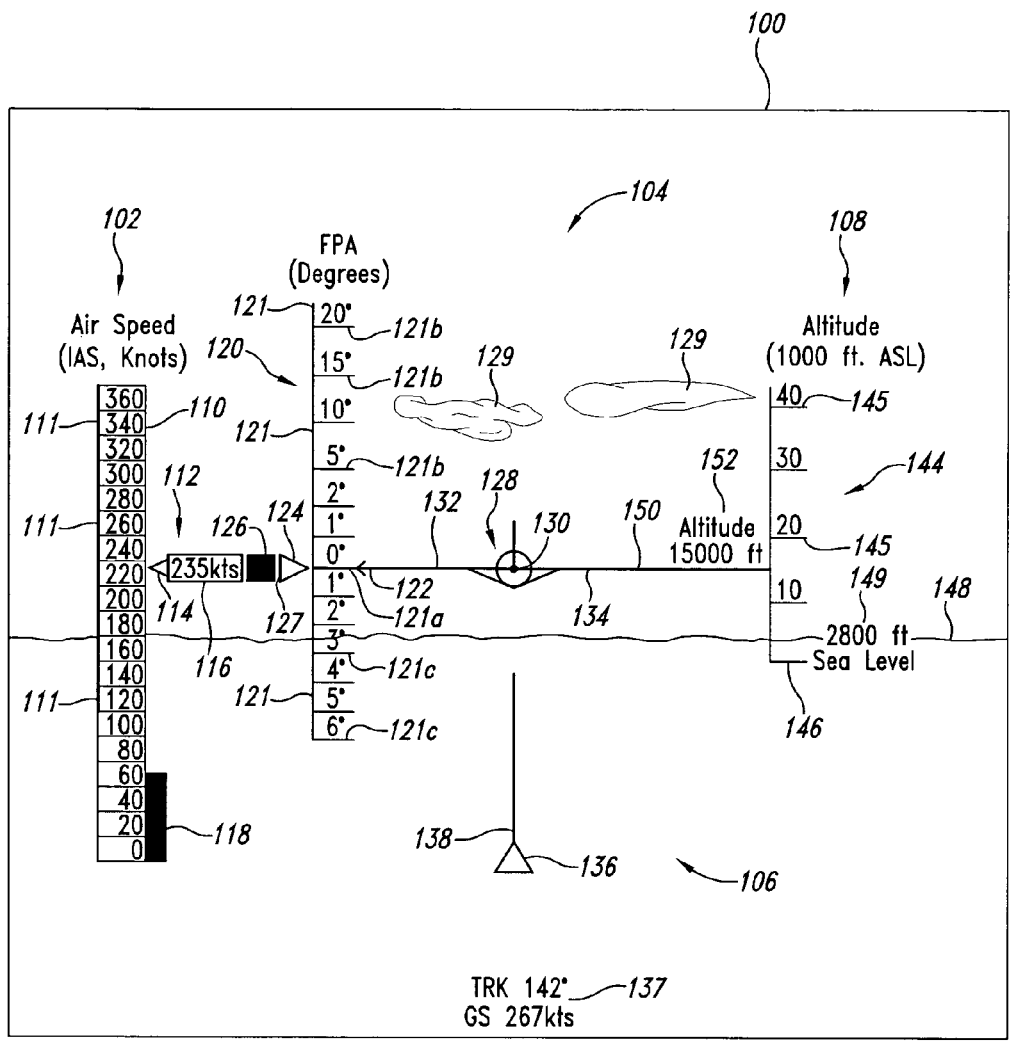
FIG. 20 is a schematic of the flight situation display of FIG. 1 depicted when the associated aircraft is leveled off at a desired altitude.

FIGS. 17–21 portray further detail of the flight situation display 100 for climb and descent of the aircraft. In FIG. 17, the aircraft has just taken off and is flying level at a 145 knots IAS with an altitude of 4,800 ft. and is accelerating before beginning the climb to reach 235 knots IAS, which is the desired climb speed. In FIG. 18, the aircraft has reached the desired IAS of 235 knots with the power being reset such that the potential air FPA indicator is near the positive 5° FPA demarcations 121*b*. Along with the power being reset, the aircraft is pitched up as indicated by the flight situation display 100 in FIG. 19 showing an air FPA indicator 124 matching the vertical position of the potential air FPA indicator 126 of a positive 5° FPA thereby stabilizing aircraft in a desired climb to 15,000 ft. altitude. In FIG. 20, the aircraft is leveled off at 15,000 ft. altitude by reducing the attitude of the aircraft and reducing the thrust or power so that the potential air FPA indicator 126, the air FPA indicator 124, and the ground FPA arrow 122 all lined up with the zero FPA angle demarcation 121*a*.

Figure 21:
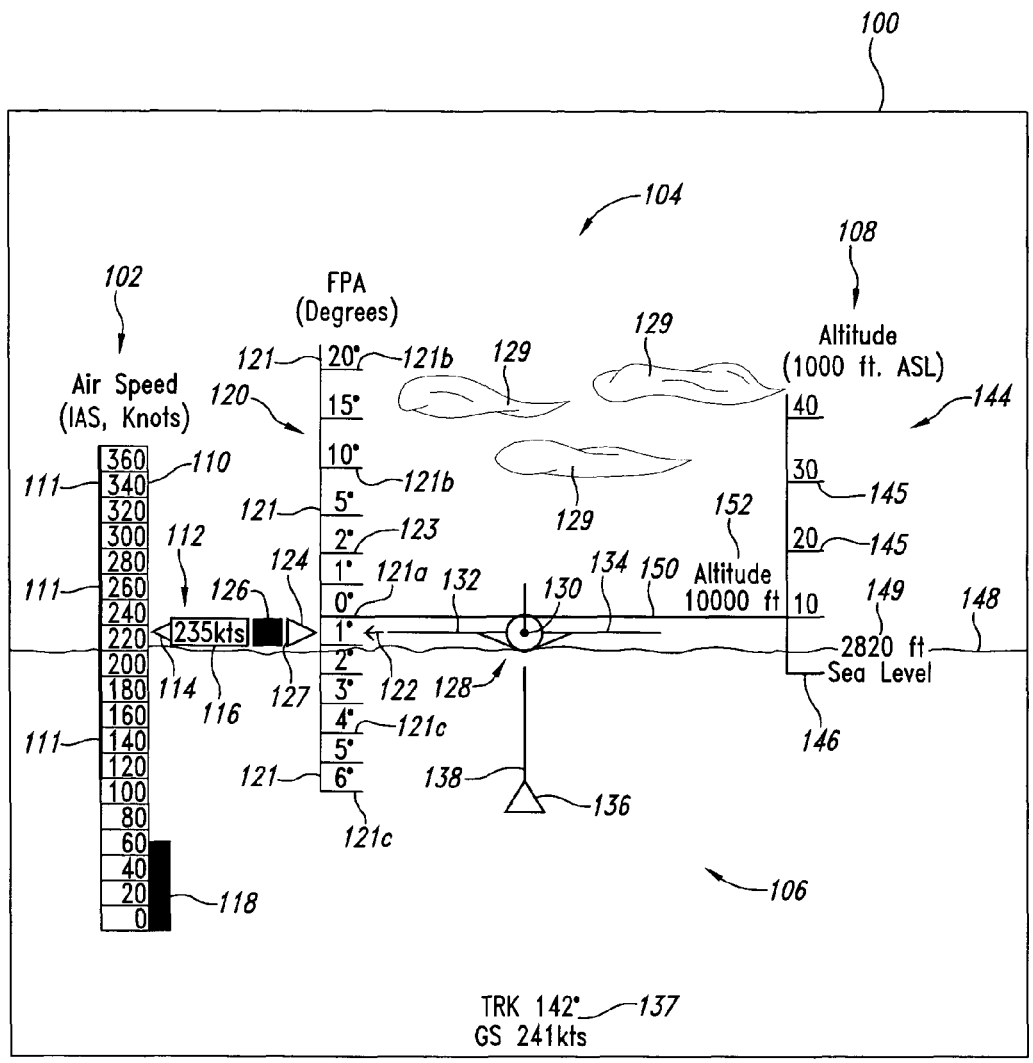
FIG. 21 is a schematic of the flight situation display of FIG. 1 depicted when the associated aircraft is flying with power adjusted for descent at a flight path angle (FPA) of negative ½ degree.

A constant airspeed descent is established by reducing the thrust of the aircraft as indicated by the potential air FPA indicator 126 to a negative FPA angle and changing the air-mass referenced vertical FPA as indicated by the air FPA indicator 124 to the same negative FPA angle as indicated by the potential air FPA indicator and shown in FIG. 21. Adjustment of the aircraft thrust and FPA angle can be performed simultaneously or in a stepwise manner to accomplish equal FPA angles as indicated by the air FPA indicator 124 and the potential air FPA indicator 126 to maintain constant airspeed. Again if there are significant wind conditions present, the ground referenced vertical FPA as indicated by the ground FPA arrow 122 will be in a different vertical position than that of the air FPA indicator 124 and the potential air FPA indicator 126.

Figure 22:
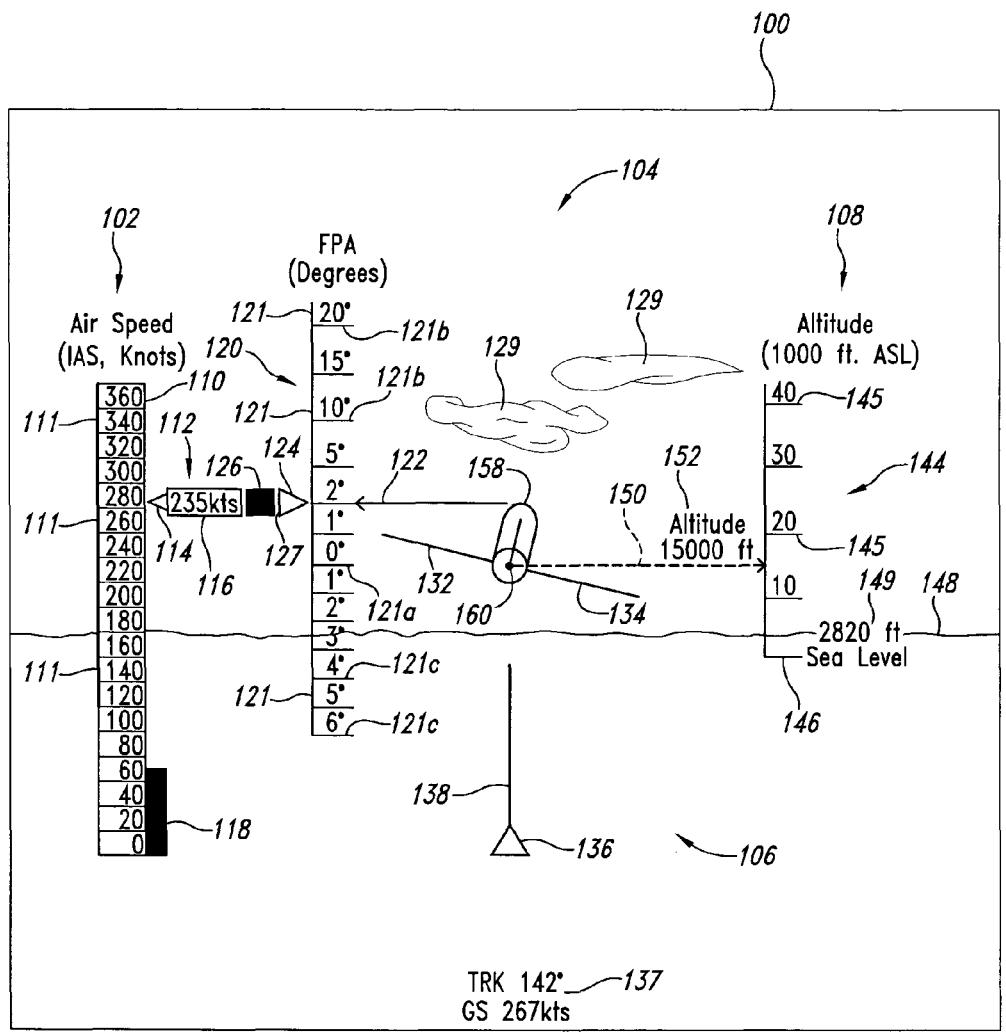
FIG. 22 is a schematic of the flight situation display showing an alternative implementation of the ground FPA indicator with the aircraft in a positive ground FPA.
Figure 23:
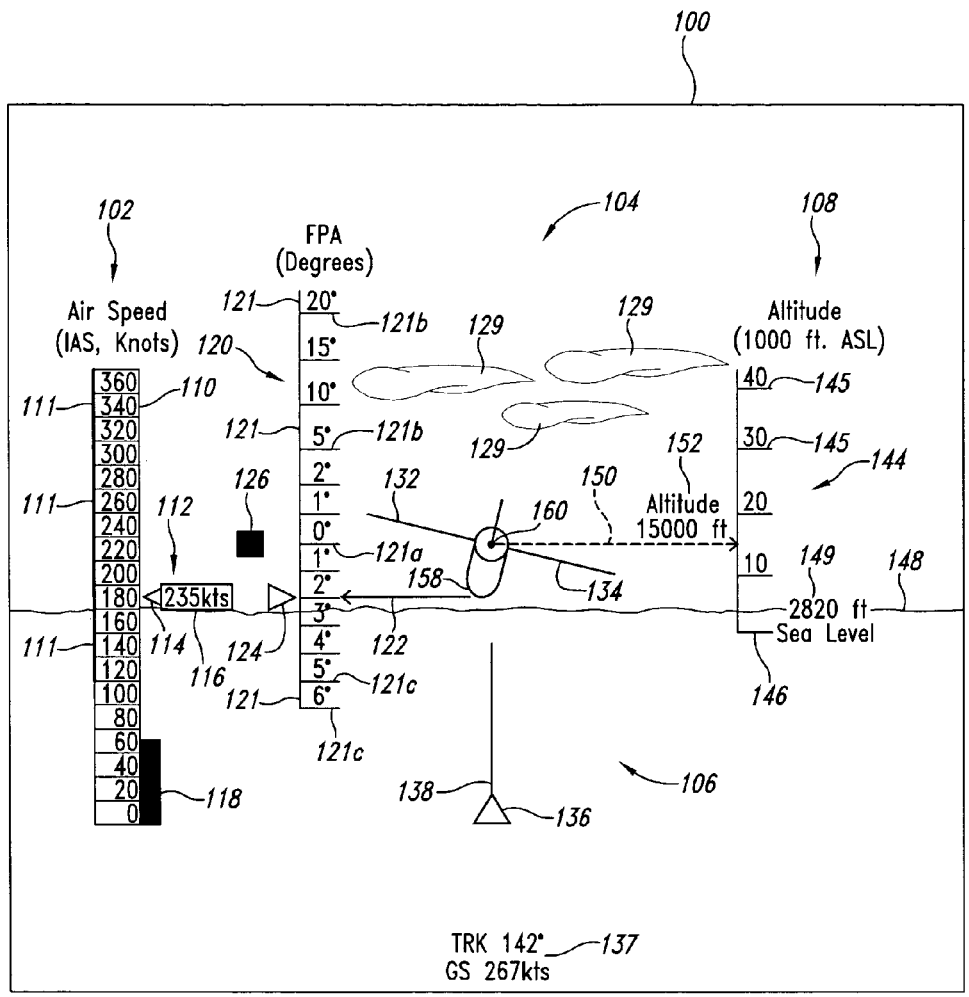
FIG. 23 is a schematic of the flight situation display showing the alternative implementation of the ground FPA indicator with the aircraft in a negative ground FPA.

An alternative implementation is depicted in FIGS. 22–25 wherein the ground FPA dot 130 is replaced with an aircraft nose tip 158 to indicate ground FPA along with the ground FPA arrow 122. The aircraft nose tip 158 is positioned with respect to the FPA scale 120 to be horizontally in line with the FPA demarcation 121 corresponding with the present ground FPA of the aircraft. An altitude dot 160 in this alternative implementation is in the same position on the aircraft symbol 128 as the ground FPA dot 130 in the before depicted implementations. The altitude dot 160 is positioned with respect to the altitude scale 144 to be horizontally in line with an altitude demarcation 145 corresponding with the present altitude of the aircraft. In FIG. 22, the aircraft nose tip 158 indicates that the aircraft has a positive 2 degree ground FPA and the altitude dot 160 indicates that the aircraft is at an altitude of 15,000 ft. In FIG. 23, the aircraft nose tip 158 indicates that the aircraft has a negative 2 degree ground FPA and the altitude dot 160 indicates that the aircraft is at an altitude of 15,000 ft.

Figure 24:
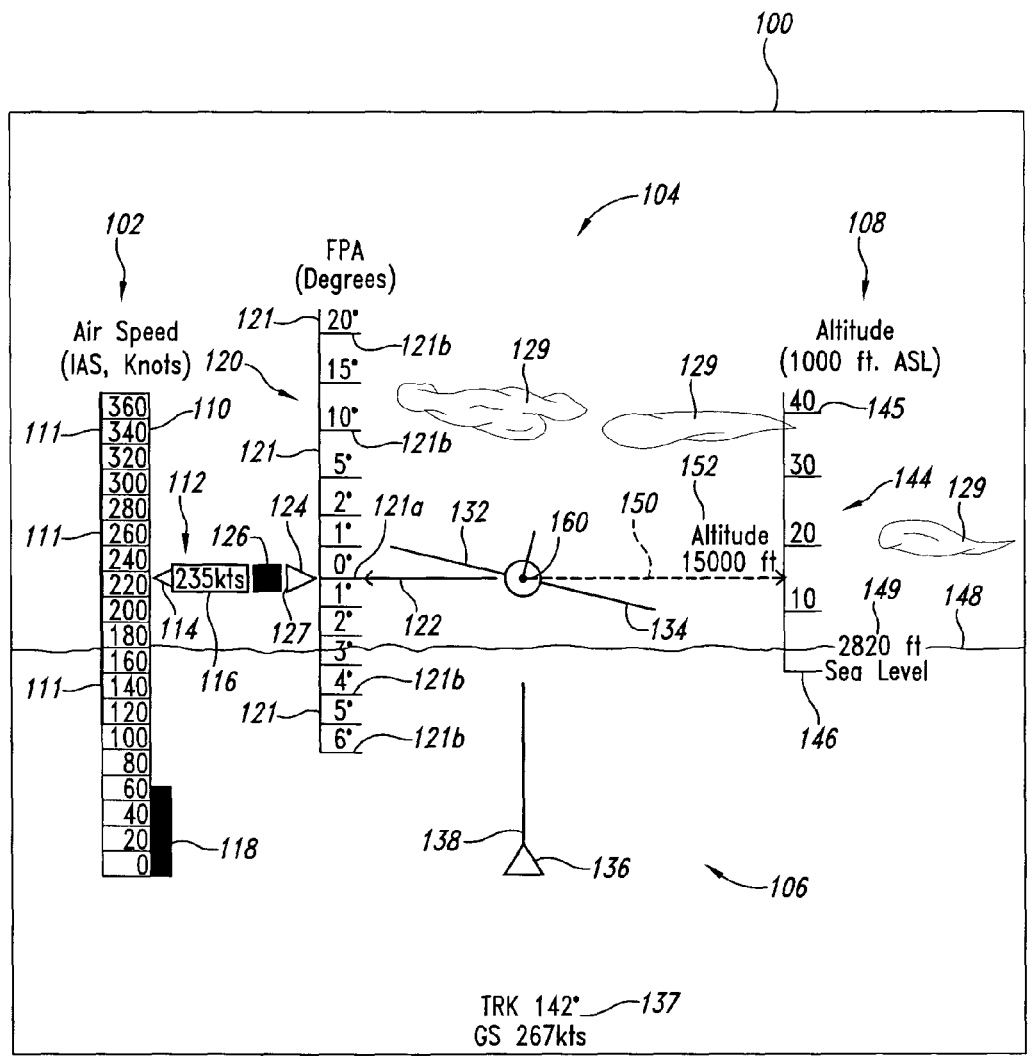
FIG. 24 is a schematic of the flight situation display showing the alternative implementation of the ground FPA indicator with the aircraft in a zero ground FPA and banked turn.
Figure 25:
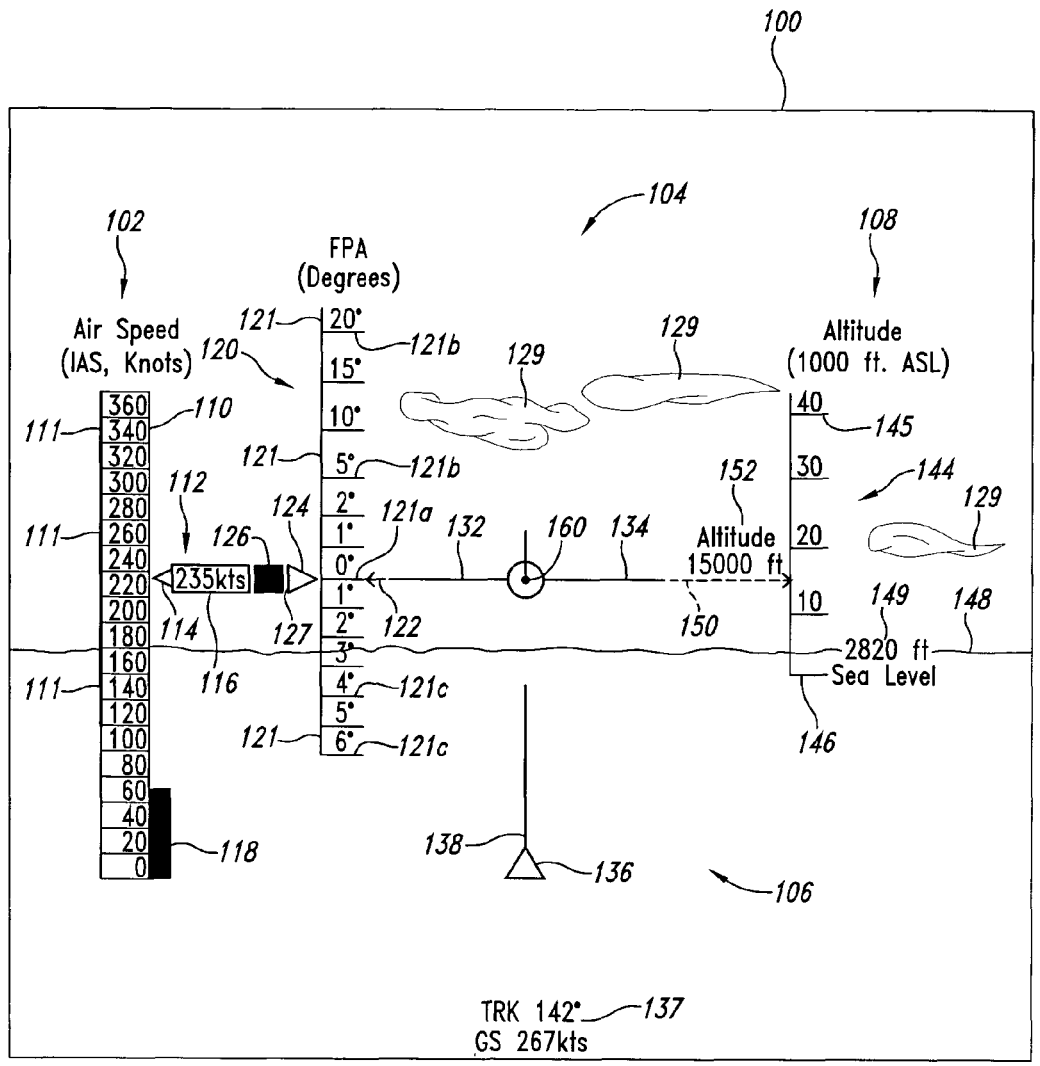
FIG. 25 is a schematic of the flight situation display showing the alternative implementation of the ground FPA indicator with the aircraft in a zero ground FPA and level flight.

In FIGS. 24 and 25, the aircraft nose tip 158 is not shown, which indicates that the aircraft presently has a zero ground FPA. For sake of visual display clarity, in this implementation, if the aircraft had a very small non-zero ground FPA, the aircraft nose tip 158 could still be graphically shown in a pronounced fashion similar in graphical degree to that shown in FIGS. 22 and 23 with spacing of the FPA demarcations 121 on the FPA scale 120 scaled to properly reflect the present small non-zero ground FPA of the aircraft.

Figure 26:
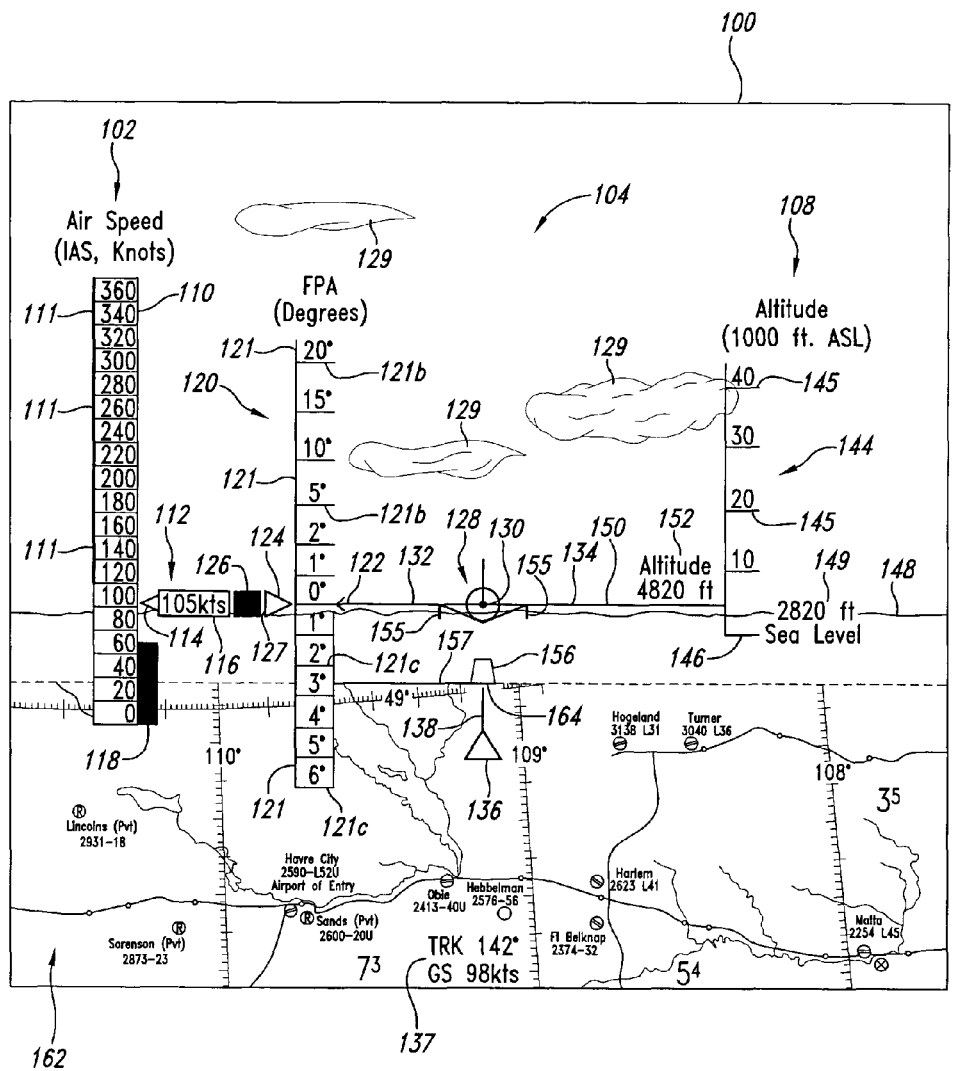
FIG. 26 is a schematic of the flight situation display showing an alternative implementation with a map displayed in the navigation area.

An implementation depicted in FIG. 26 includes a map 162 displayed in the navigation area 106 showing location of the aircraft and a destination runway through positioning of the aircraft position indicator 136 and positioning of a bottom edge 164 of the runway symbol 156 on the map. The map 162 extends upwardly to a bottom edge 164 of the runway symbol 156 depicted from the perspective of the pilot at the present final approach location of the aircraft relative to the runway. Since the runway symbol 156 is depicted in a perspective view of the runway as the pilot would perceive on final approach, the runway symbol is not dimensionally correct relative to the scale of the map so that the map does not extend past the bottom edge 164 of the runway symbol. In this implementation, typically the map 162 would extend to the terrain elevation line 148 except as in the case shown in FIG. 26 where something such as a destination runway on final approach would be displayed in a perspective view also in the navigation area 106.

Figure 27:
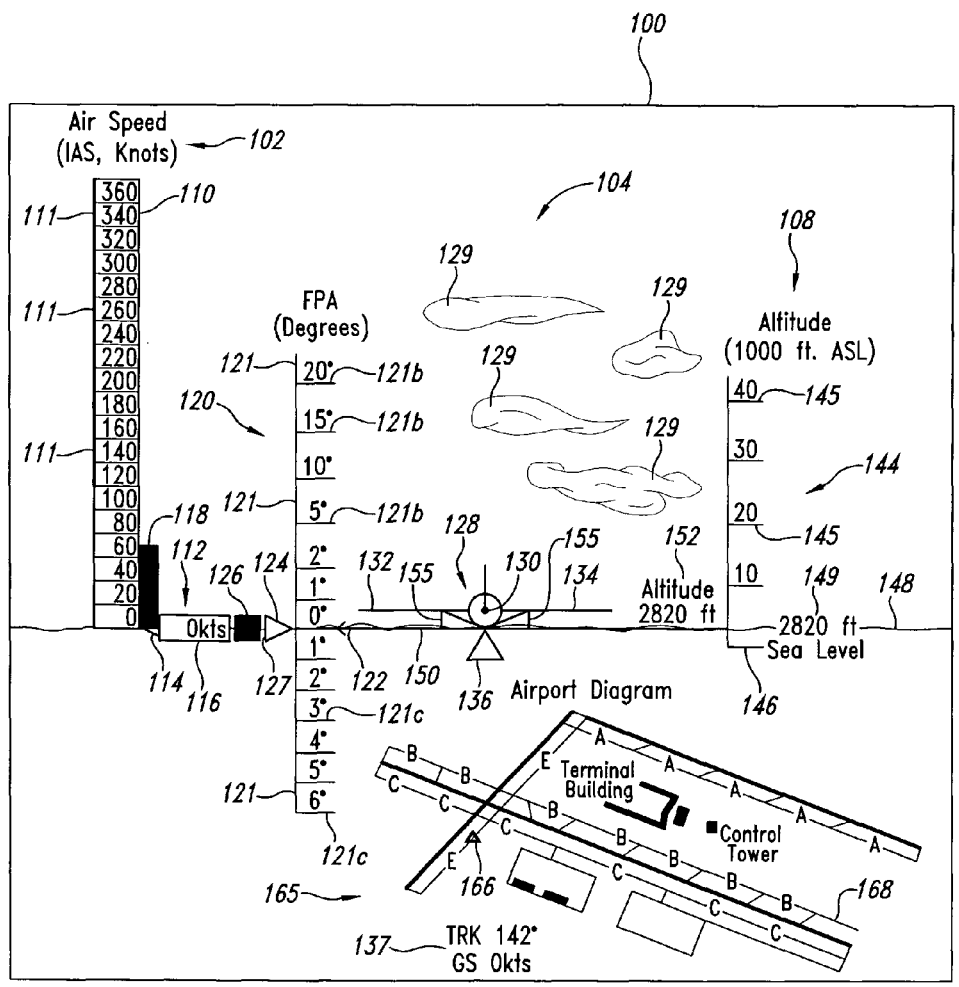
FIG. 27 is a schematic of the flight situation display showing an alternative implementation with a taxi map displayed in the navigation area.
Figure 28:
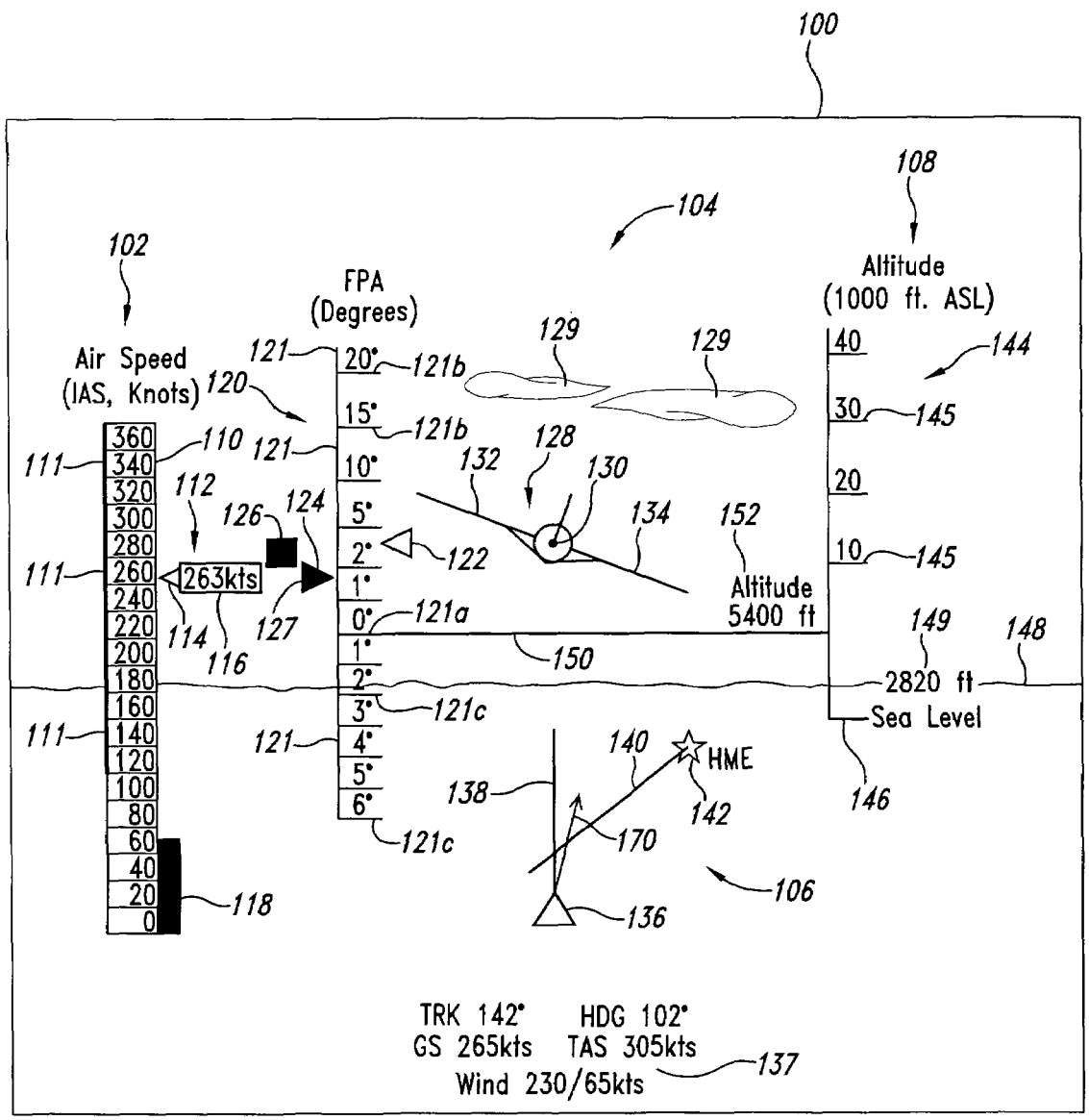
FIG. 28 is a schematic of the flight situation display showing an alternative implementation of the ground FPA indicator and including a heading indicator displayed in the navigation area.

When the position of the aircraft becomes closer to the ground, the map 162 changes in scale such as with 80, 50, 20, 10, and 5 mile ranges being displayed across the width of the map depending upon altitude of the aircraft. In the case when the aircraft is on the ground, the map 162 displayed in the navigation area 106 becomes a taxi map 165 of an airport at which the aircraft is presently located. As shown in FIG. 27, a landed aircraft symbol 166 portrays the aircraft on the ground taxiing on taxiway B 168 of the airport. Further information can be provided in the navigation area 106 such as a heading vector 170 showing the direction that the aircraft is pointing in contrast with the wings level predictive track line 138 showing the direction that the aircraft is presently traveling as shown in FIG. 28. The readout 137 can also display numerical values of the true airspeed (TAS) and the wind condition: wind direction/wind speed. Also shown in FIG. 28 is an alternative implementation of the ground FPA arrow 122 having a triangular shape similar to the air FPA indicator 124. In this implementation, the ground FPA arrow 122 and the air FPA indicator 124 can be displayed in different colors with the potential FPA indicator 126 being displayed in the same color as the air FPA indicator. The altitude scale 144 has been graphically expanded by a factor of two from zero to 10,000 feet for better legibility.

Measurement and determination of the parameters discussed including IAS, ground-referenced FPA, air-mass referenced vertical FPA, potential air-mass referenced vertical FPA, altitude, and aircraft position and tracking are conventionally known. Furthermore, general conversion of parameter values into graphically oriented symbols for visual display are also conventionally known. On the other hand, how these various parameters discussed are visually represented by various symbol forms and integrated to form an overall flight situation presentation system as discussed herein is beyond the scope of conventional teaching.

Additionally, as has been shown by way of example provided by the depicted alternative implementations, various other symbol forms and integration could be used while still remaining in the present scope of the invention, which seeks to present flight situation information as has been described. It follows that from the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method comprising:
receiving data regarding an aircraft;
displaying on a first portion of a display an air-mass referenced flight path angle (FPA) indicator to indicate FPA of the aircraft relative to air mass; and
displaying on a second portion of the display a ground-referenced FPA indicator to indicate FPA of the aircraft relative to ground.

2. The method of claim 1 further comprising displaying on a third portion of the display an altitude scale positioned on the display relative to a reference point on the display to indicate present altitude of the aircraft.

3. The method of claim 2 wherein the first portion of the display is positioned relative to the reference point when the air-mass referenced FPA indicator is displayed to indicated FPA of the aircraft relative to air-mass and the second portion of the display is positioned relative to the reference point when the ground referenced FPA indicator is displayed to indicate FPA of the aircraft relative to the ground.

4. The method of claim 3 further comprising displaying the reference point as a zero FPA demarcation.

5. The method of claim 1 wherein the air-mass referenced FPA indicator and the ground-referenced FPA indicator are displayed as sharing a common FPA scale having FPA demarcations including a zero FPA demarcation.

6. The method of claim 5 further comprising displaying on a third portion of the display an altitude scale, the third portion being positioned on the display such that the zero FPA demarcation is in line with a position on the altitude scale indicating present altitude of the aircraft.

7. The method of claim 1 wherein the data is received as generated data with the regarded aircraft being simulated.

8. The method of claim 1 wherein the data is received as flight data with the regarded aircraft being in physical flight.

9. The method of claim 8 wherein the flight data is received to include at least global position system (GPS) data.

10. A method comprising:
receiving data regarding an aircraft;
displaying on a first portion of a display an air-mass referenced FPA indicator to indicate FPA of the aircraft relative to air mass; and displaying on a second portion of the display a potential air-mass referenced FPA indicator to indicate the amount of power being expended at a current thrust setting of the aircraft at a current airspeed.

11. The method of claim 10 wherein the air-mass referenced FPA indicator and the potential air-mass referenced FPA indicator are displayed as sharing a common FPA scale.

12. The method of claim 10 wherein the air-mass referenced FPA indicator and the potential air-mass referenced FPA indicator are displayed on the display such that position of the first portion of the display relative to position of the second portion of the display is associated with one of acceleration and deceleration of the aircraft.

13. The method of claim 10 further comprising displaying on a third portion of the display a ground-referenced FPA indicator to indicate FPA of the aircraft relative to ground.

14. The method of claim 13 wherein the air-mass referenced FPA indicator, the potential air-mass referenced FPA indicator, and the ground-referenced FPA indicator are displayed as sharing a common FPA scale.

15. A method comprising:

receiving data regarding an aircraft;

displaying on a first portion of a display a ground referenced FPA indicator to indicate FPA of the aircraft relative to ground; and displaying on a second portion of the display a predictive track indicator to indicate direction of flight of the aircraft.

16. A method comprising:

receiving data regarding an aircraft;

displaying on a first portion of a display an air-mass referenced FPA indicator to indicate FPA of the aircraft relative to air mass; and displaying on a second portion of the display an indicated airspeed (IAS) scale position relative to the air-mass referenced FPA indicator according to present IAS of the aircraft.

* * * * *